US011598026B2

(12) United States Patent
Brown et al.

(10) Patent No.: US 11,598,026 B2
(45) Date of Patent: Mar. 7, 2023

(54) SPUN-BLOWN NON-WOVEN WEB

(71) Applicant: Biax-Fiberfilm Corporation, Greenville, WI (US)

(72) Inventors: Douglas B. Brown, Fremont, WI (US); Jeffrey D. Stark, Neenah, WI (US); Mohammad A. Hassan, Johnson City, TN (US)

(73) Assignee: BIAX-FIBERFILM CORPORATION, Greenville, WI (US)

( * ) Notice: Subject to any disclaimer, the term of this patent is extended or adjusted under 35 U.S.C. 154(b) by 52 days.

(21) Appl. No.: 15/651,964

(22) Filed: Jul. 17, 2017

(65) Prior Publication Data

US 2018/0002832 A1    Jan. 4, 2018

Related U.S. Application Data

(63) Continuation-in-part of application No. 14/271,675, filed on May 7, 2014, now abandoned.

(51) Int. Cl.
*D04H 3/02*         (2006.01)
*D01D 5/098*        (2006.01)
(Continued)

(52) U.S. Cl.
CPC .......... *D01D 5/0985* (2013.01); *B29C 48/05* (2019.02); *D01D 4/025* (2013.01); *D01F 6/06* (2013.01);
(Continued)

(58) Field of Classification Search
CPC ...... D01D 5/0985; D01D 4/025; D01D 5/098; D04H 1/492; D04H 1/56; D04H 3/03;
(Continued)

(56) References Cited

U.S. PATENT DOCUMENTS 3,704,198 A    11/1972   Prentice
4,100,324 A    7/1978    Anderson et al.
(Continued)

FOREIGN PATENT DOCUMENTS

EP    0341875    11/1989
EP    1101854    5/2001
(Continued)

OTHER PUBLICATIONS

Mohammad Abouelreesh Hassan; Advances in Spun-Blown Fiber Technology and its Applications; ResearchGate; Jan. 2015; 26 pages.
(Continued)

*Primary Examiner* — Andrew T Piziali
(74) *Attorney, Agent, or Firm* — Boyle Fredrickson, S.C.

(57) ABSTRACT

A spun-blown non-woven web is disclosed which is formed from a plurality of fibers formed from a single polymer having an average fiber diameter ranging from between about 0.5 microns to about 50 microns; a basis weight of at least about 0.5 gsm; a tensile strength, measured in a machine direction, ranging from between about 20 g to about 4,200 g; a ratio of tensile strength, measured in the machine direction, to basis weight of at least about 20:1; and a ratio of percent elongation, measured in the machine direction, to fiber diameter of at least about 15.

9 Claims, 8 Drawing Sheets

(51) Int. Cl.

| | | |
|---|---|---|
| *D04H 1/56* | (2006.01) | |
| *D04H 3/16* | (2006.01) | |
| *B29C 48/05* | (2019.01) | |
| *D01D 4/02* | (2006.01) | |
| *D04H 1/492* | (2012.01) | |
| *D04H 1/72* | (2012.01) | |
| *D01F 6/06* | (2006.01) | |
| *D04H 3/03* | (2012.01) | |
| *D04H 3/005* | (2012.01) | |
| *B29C 48/345* | (2019.01) | |

(52) U.S. Cl.
CPC ............... *D04H 1/492* (2013.01); *D04H 1/56* (2013.01); *D04H 1/72* (2013.01); *D04H 3/03* (2013.01); *D04H 3/16* (2013.01); *B29C 48/345* (2019.02); *D04H 3/005* (2013.01); *Y10T 442/609* (2015.04)

(58) Field of Classification Search
CPC .............. D04H 3/16; D04H 1/72; D04H 3/02; B29C 48/345; B29C 48/30
USPC ........................................................ 442/340
See application file for complete search history.

(56) References Cited

U.S. PATENT DOCUMENTS

| | | | |
|---|---|---|---|
| 4,380,570 A | | 4/1983 | Schwarz |
| 4,429,001 A | | 1/1984 | Kolpin et al. |
| 4,731,215 A | | 3/1988 | Schwarz |
| 4,923,454 A | | 5/1990 | Seymour et al. |
| 5,306,545 A | * | 4/1994 | Shirayanagi ......... D04H 1/4291 |
| | | | 128/206.12 |
| 5,350,624 A | | 9/1994 | Georger et al. |
| 5,476,616 A | | 12/1995 | Schwarz |
| 5,508,102 A | | 4/1996 | Georger et al. |
| 5,652,048 A | * | 7/1997 | Haynes ................. D01D 4/025 |
| | | | 210/502.1 |
| 6,013,223 A | | 1/2000 | Schwarz |
| 6,315,114 B1 | | 11/2001 | Keck et al. |
| 6,471,910 B1 | | 10/2002 | Haggard et al. |
| 6,494,974 B2 | | 12/2002 | Riddell |
| 6,632,504 B1 | | 10/2003 | Gillespie et al. |
| 7,018,188 B2 | | 3/2006 | James et al. |
| 7,972,986 B2 | | 7/2011 | Barnholtz et al. |
| 8,017,534 B2 | | 9/2011 | Harvey et al. |
| 8,122,570 B2 | | 2/2012 | Jezzi |
| 8,303,888 B2 | | 11/2012 | Brown et al. |
| 8,852,474 B2 | | 10/2014 | Barnholtz et al. |
| 9,260,808 B2 | | 2/2016 | Schmidt et al. |
| 9,926,648 B2 | | 3/2018 | Barnholtz et al. |
| 10,024,000 B2 | | 7/2018 | Barnholtz et al. |
| 10,513,801 B2 | | 12/2019 | Barnholtz et al. |
| 10,633,774 B2 | | 4/2020 | Brown et al. |
| 10,858,785 B2 | | 12/2020 | Barnholtz et al. |
| 2005/0056956 A1 | | 3/2005 | Zhao et al. |
| 2005/0079781 A1 | | 4/2005 | Tsujimoto et al. |
| 2005/0244638 A1 | | 11/2005 | Chang et al. |
| 2008/0016782 A1 | | 1/2008 | Vinadio |
| 2009/0022983 A1 | | 1/2009 | Cabell et al. |
| 2009/0233049 A1 | | 9/2009 | Jackson et al. |
| 2009/0233073 A1 | | 9/2009 | Bornemann et al. |
| 2009/0256277 A1 | | 10/2009 | Brown et al. |
| 2011/0045261 A1 | | 2/2011 | Sellars |
| 2011/0076907 A1 | | 3/2011 | Glew et al. |
| 2011/0196332 A1 | | 8/2011 | Cheng et al. |
| 2012/0066855 A1 | | 3/2012 | Schmidt et al. |
| 2012/0177888 A1 | * | 7/2012 | Escafere ................ B32B 5/26 |
| | | | 428/162 |
| 2012/0208422 A1 | | 8/2012 | Koori et al. |
| 2013/0165007 A1 | | 6/2013 | Pourdeyhimi et al. |
| 2014/0374967 A1 | | 12/2014 | Datta et al. |
| 2015/0322602 A1 | | 11/2015 | Brown et al. |
| 2016/0355950 A1 | | 12/2016 | Young et al. |
| 2018/0002832 A1 | | 1/2018 | Brown et al. |
| 2018/0305871 A1 | | 10/2018 | Barnholtz et al. |
| 2019/0136458 A1 | | 5/2019 | Barnholtz et al. |
| 2019/0242066 A1 | | 8/2019 | Barnholtz et al. |
| 2020/0102671 A1 | | 4/2020 | Barnholtz et al. |

FOREIGN PATENT DOCUMENTS

| | | |
|---|---|---|
| EP | 2479331 A1 | 7/2012 |
| EP | 1638496 B1 | 5/2013 |
| JP | 2009545682 A | 12/2009 |
| WO | 2000056201 A1 | 9/2000 |
| WO | 2002052084 A2 | 7/2002 |
| WO | 2008016782 A1 | 2/2008 |
| WO | 2008034613 A1 | 3/2008 |

OTHER PUBLICATIONS

Search Report for CN2015/80037036.X dated Jun. 13, 2018.
First Office Action for CN2015/80037036.X dated Jun. 26, 2018.
Second Office Action for CN2015/80037036.X dated Mar. 28, 2019.
Third Office Action for CN2015/80037036.X dated Nov. 1, 2019.
First Office Action for EP 15 724 435.1 dated Mar. 23, 2020.
Written Opinion for PCT/US2015/029385 dated Nov. 12, 2015.
Office Action for JP2016-566910 dated Feb. 28, 2019.
Office Action for JP2016-566910 dated Jan. 9, 2020.
Extended European Search Report for Application No. 18834401.4 dated Mar. 24, 2021.
EPO Office Action for Application No. 15 724 435.1-1102, dated Aug. 11, 2021, 4 pages.
IN Examination Report for Application No. 201647041451, dated Aug. 12, 2020, 7 pages.
EP Office Action for Application No. 18834401.4-1102/3655577, dated Apr. 13, 2021, 1 page.
JP Office Action and English Translation for Application No. 2020-083061, dated Jun. 30, 2021, 6 pages.
JP Office Action and English Translation for Application No. 2020-083061, dated Mar. 30, 2022, 6 pages.

* cited by examiner

SPUN-BLOWN NON-WOVEN WEB

CROSS REFERENCE TO RELATED APPLICATION

This application claims priority to pending non-provisional patent application Ser. No. 14/271,675, filed May 7, 2014, and entitled: "A NON-WOVEN WEB".

FIELD OF THE INVENTION

This invention relates to a Spun-Blown® non-woven web.

BACKGROUND OF THE INVENTION

Conventional meltblown fibers can be manufactured with very fine diameters, in the range of less than 1 micron to about 10 microns. These fine diameters are very advantageous in forming various kinds of non-woven fabrics. However, conventional meltblown fibers are extremely weak in strength due to the high die and air temperatures used in the forming process. To the contrary, spunbond fibers can be manufactured to be very strong but have a much larger diameter, in the range of from about 15 to about 50 microns. Fabrics formed from spunbond are less opaque and tend to exhibit a rough surface since the fiber diameters are quite large. Typically, spunbond-meltblown-spunbond (SMS) non-woven structures are formed because the conventional meltblown fibers do not have the strength necessary to make a one layer fabric. They need the added spunbond layers on the outside to make an acceptable strong non-woven web.

The problem, up to now, is that no one has been able to find a way to extrude smaller fibers, having a diameter close to those of meltblown fibers, yet having similar strength of spunbond fibers.

Now, a Spun-Blown® non-woven web has been invented which solves this problem.

SUMMARY OF THE INVENTION

Briefly, this invention relates to an apparatus and a process for forming a Spun-Blown® non-woven web, and the web itself. The apparatus for producing a Spun-Blown® non-woven web includes a die block having an inlet for receiving a molten material which communicates with a cavity. The die block also has a gas passage through which pressurized gas can be introduced. The gas passage has an inside diameter. An insert is positioned in the gas passage and has an inside diameter and an outside diameter. A major portion of the outside diameter is smaller than the inside diameter of the gas passage to form an air chamber therebetween. The apparatus also includes a spinnerette secured to the die block which has a gas chamber isolated from the cavity. The spinnerette also has a gas passageway which connects the gas chamber to the gas passage. A plurality of nozzles and a plurality of stationary pins are secured to the spinnerette. The plurality of nozzles and the plurality of stationary pins are grouped into an array of a plurality of rows and a plurality of columns, having a periphery. Each of the plurality of nozzles is connected to the cavity. The apparatus further includes a gas distribution plate secured to the spinnerette which has a plurality of first, second and third openings formed therethrough. Each of the first openings surrounds one of the nozzles, each of the second openings surrounds one of the stationary pins, and each of the third openings is located adjacent to the first and second openings.

The apparatus also includes an exterior member secured to the gas distribution plate. The exterior member has a plurality of first and second enlarged openings formed therethrough. Each of the first enlarged openings surrounds one of the nozzles and each of the second enlarged openings surrounds one of the stationary pins. The array of nozzles and stationary pins has at least one row and at least one column, which are located adjacent to the periphery, being made up of the second enlarged openings. The pressurized gas exits through both the first and second enlarged openings at an adjustable velocity. The molten material is extruded into filaments and each of the filaments is shrouded by the pressurized gas to be attenuated into solid fibers due to the acceleration of the fibers and the quenching effect of the expansion of the pressurized gas. In addition, the periphery around all of the extruded filaments/fibers is shrouded by another pressurized gas curtain to isolate them from the surrounding ambient air, essentially a dual shroud system. Lastly, the apparatus includes a moving surface located downstream of the exterior member onto which the fibers are collected into a Spun-Blown® non-woven web.

The process for forming a Spun-Blown® non-woven web includes the steps of forming a single molten polymer and directing the molten polymer through a die block. The die block has a cavity and an inlet connected to the cavity which conveys a molten material therethrough. The die block also has a gas passage formed therethrough for conveying pressurized gas. The gas passage has an inside diameter. An insert is positioned in the gas passage. The insert has an inside diameter and an outside diameter. A major portion of the outside diameter is smaller than the inside diameter of the gas passage to form an air chamber therebetween. A spinnerette body is secured to the die block. The spinnerette body has a gas chamber and a gas passageway connecting the gas chamber to the gas passage. The spinnerette body has a plurality of nozzles and a plurality of stationary pins secured thereto which are grouped into an array of a plurality of rows and a plurality of columns. The array has a periphery. A gas distribution plate is secured to the spinnerette body. The gas distribution plate has a plurality of first, second and third openings formed therethrough. Each of the first openings surrounds one of the nozzles, each of the second openings surrounds one of the stationary pins, and each of the third openings is located adjacent to the first and second openings. An exterior member is secured to the gas distribution plate. The exterior member has a plurality of first and second enlarged openings formed therethrough. Each of the first enlarged openings surrounds one of the nozzles and each of the second enlarged openings surrounds one of the stationary pins. The array of nozzles and stationary pins has at least one row and at least one column of the second enlarged openings which are located adjacent to the periphery. The extruded filament exiting each of the nozzles is shrouded by the pressurized gas to be attenuated and solidified into fibers. In addition, the periphery around all of the extruded filaments/fibers is shrouded by pressurized gas exiting each of said second enlarged openings to isolate them from the surrounding ambient air, essentially a dual shroud system. Lastly, the fibers are collected on a moving surface to form a Spun-Blown® non-woven web.

The Spun-Blown® nonwoven web of this invention has a plurality of fibers formed from a single molten polymer having an average fiber diameter ranging from between about 0.5 microns to about 50 microns, a basis weight of at least about 0.5 grams per square meter (gsm), and a tensile strength, measured in a machine direction, ranging from between about 20 g to about 4,200 g; a ratio of tensile strength, measured in the machine direction, to basis weight of at least about 20:1; and a ratio of percent elongation, measured in the machine direction, to fiber diameter of at least about 15.

In another embodiment, the Spun-Blown® nonwoven web has a plurality of fibers formed from a homopolymer having an average fiber diameter ranging from between about 0.5 microns to about 50 microns; a basis weight of at least about 0.5 gsm; a tensile strength, measured in a machine direction, ranging from between about 20 g to about 4,140 g; a ratio of tensile strength, in the machine direction, to basis weight of from between about 20:1 to about 50:1; and a ratio of percent elongation, measured in the machine direction, to fiber diameter of from between about 20 to about 50.

In still another embodiment, the Spun-Blown® nonwoven web has a plurality of fibers formed from a homopolymer having an average fiber diameter ranging from between about 1 micron to about 50 microns; a basis weight of at least about 1 gsm; and a tensile strength, measured in a machine direction, ranging from between about 80 g to about 3,500 g; a ratio of tensile strength, measured in the machine direction, to basis weight of from between about 20:1 to about 48:1; and a ratio of percent elongation, measured in the machine direction, to fiber diameter of from between about 25 to about 45.

The general object of this invention is to provide a Spun-Blown® non-woven web. A more specific object of this invention is to provide a Spun-Blown® non-woven web which is much stronger than a typical meltblown web.

Another object of this invention is to provide a Spun-Blown® non-woven web which has fine fibers, each having a fiber diameter similar to the diameter of a conventional meltblown fiber and each having a strength comparable to the strength of a spunbond fiber, and the web exhibiting excellent filtration properties.

A further object of this invention is to provide a Spun-Blown® non-woven web with fine fibers having a diameter ranging from between about 0.5 microns to about 50 microns, a basis weight of at least about 0.5 gsm, and a tensile strength, measured in a machine direction, ranging from between about 20 g to about 4,140 g.

Still another object of this invention is to provide a Spun-Blown® non-woven web which is easy to process.

Still further, an object of this invention is to provide a Spun-Blown® non-woven web which can be produced at a reasonable cost.

Other objects and advantages of the present invention will become more apparent to those skilled in the art in view of the following description and the accompanying drawings.

BRIEF DESCRIPTION OF THE DRAWINGS 1. 1 is a schematic of a process for forming a Spun-Blown® non-woven web.

DETAILED DESCRIPTION OF THE INVENTION

Definitions

Figure 1:
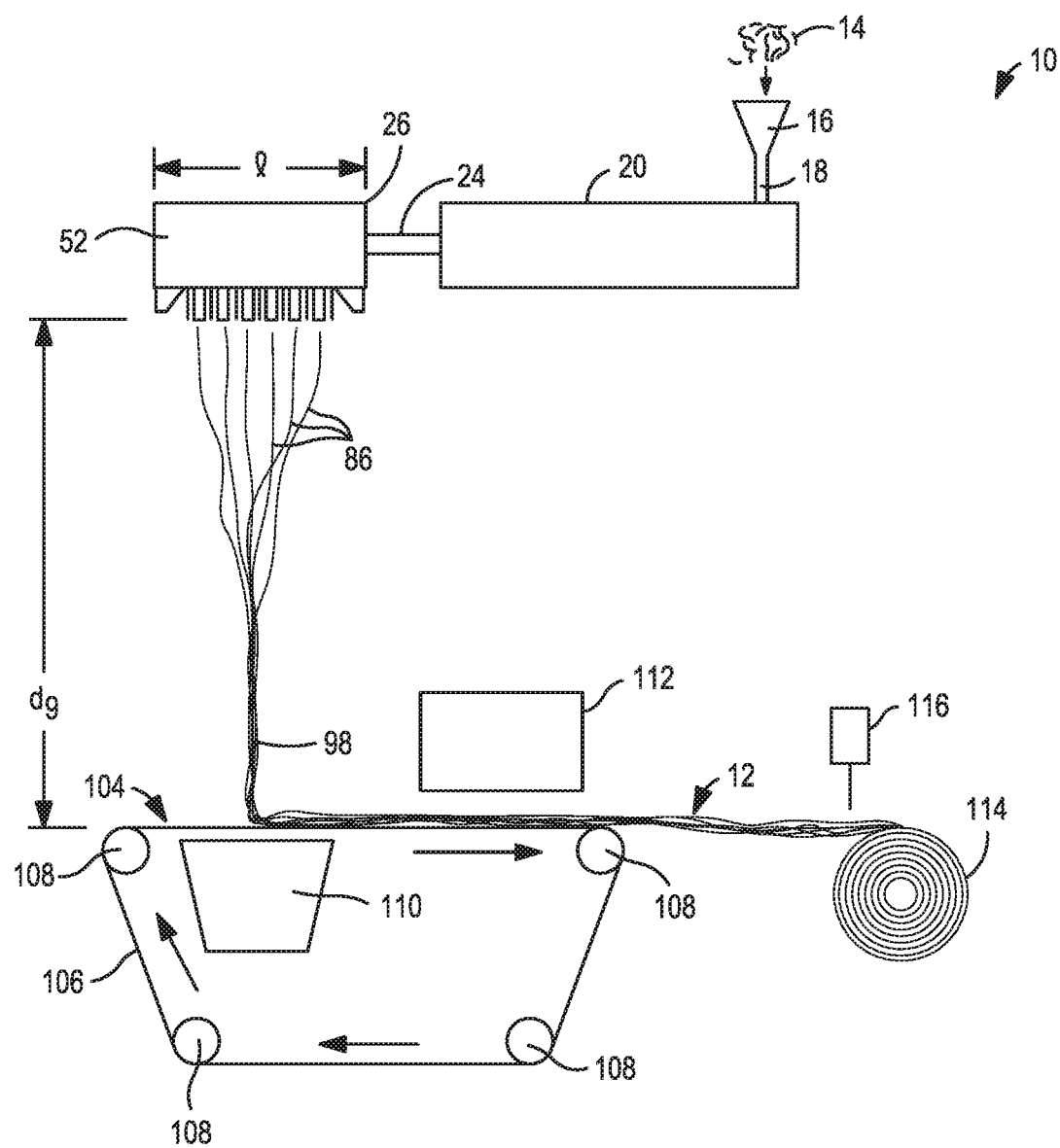

Spun-Blown® non-woven web is defined as a sheet, web or batt of natural and/or man-made fibers or filaments (excluding paper) that have not been converted into yarns, and that are bonded to each other by mechanical, hydromechanical, thermal or chemical means. SPUN-BLOWN is a registered trademark of Biax Fiberfilm Corporation having an office at N1001 Tower View Drive, Greenville, Wis. 54942.

Spunmelt is a process where fibers are spun from molten polymer through a plurality of nozzles in a die head connected to one or more extruders. The spunmelt process may include meltblowing, spunbonding and the present inventive process, which we call Spun-Blown® because we can combine the properties of both meltblown and spunbond into one non-woven web.

Meltblown is a process for producing very fine fibers having a diameter of less than about 10 microns, where a plurality of molten polymer streams, formed in a single row, are attenuated using a hot, high speed gas stream once the filaments emerge from the nozzles. The attenuated fibers are then collected on a flat belt or dual drum collector. A typical meltblowing die has around 35 nozzles per inch and a single row of spinnerettes. The typical meltblowing die uses two inclined air jets for attenuating the filaments.

Spunbond is a process for producing strong fibrous nonwoven webs directly from thermoplastics polymers by attenuating the spun filaments using high speed air introduced well below the spinning face while quenching the fibers near the spinnerette face. Individual fibers are laid down randomly on a collection belt and conveyed to a bonder to give the web added strength otherwise the web would simply pull apart without any integrity. There is no real mechanical bonding between the fibers. Fiber size is usually below 50 µm and the average fiber size has a tight fiber size distribution (+/−10%) and is in the range of from between about 10 microns to about 20 microns. The fibers are very strong compared to meltblown fibers because of the molecular chain alignment that is achieved during the attenuation of the crystallized (solidified) filaments. A typical spunbond die has multiple rows of polymer holes and the polymer melt flow rate is usually below about 500 grams/10 minutes.

The present invention is a hybrid process between a conventional meltblown process and a conventional spunbond process. The present invention bridges the gap between these two processes. The present invention uses a multi-row spinnerette similar to the spinnerette used in spunbonding except the nozzles and stationary pins are arranged in a unique fashion to allow parallel gas jets surrounding the spun filaments in order to attenuate and solidify them. In the present invention, each of the extruded filaments is shrouded by pressurized gas and it's temperature can be colder or hotter than the polymer melt. In addition, the periphery around all of the filaments is surrounded by a curtain of pressurized gas, essentially a dual shroud system.

An alternative embodiment of the present invention uses an aspirator to attenuate the molten filaments into fibers. The aspirator uses high velocity gas (air) that is directed essentially parallel to the flow direction of the filaments, instead of being directed at a steep incline angle thereto. The combination of these features produce fibers having small or fine diameters, similar to conventional meltblown fibers, yet much stronger fibers, similar to conventional spunbond fibers. The apparatus of the present invention is very flexible and versatile in that it can accommodate both meltblown and spunbond polymer resins, which may have a melt flow rate of from between about 4 grams per 10 minutes (g/10 min.) to about 6,000 g/10 min., according to the American Standard Testing Method (ASTM) D 1238, at 210° C. and 2.16 kg.

Apparatus

Referring to FIG. 1, an apparatus 10 is shown for producing a Spun-Blown® non-woven web 12. The Spun-Blown® non-woven web 12 can have a high loft. A single polymer resin 14, in the form of small solid pellets, is placed into a hopper 16 and is then routed through a conduit 18 to an extruder 20. In the extruder 20, the polymer resin 14 is heated to an elevated temperature. The temperature will vary depending on the particular composition and melt temperature of a particular polymer. Usually, the polymer resin 14 is heated to a temperature at or above its melt temperature. The melted polymer resin 14 is transformed into a molten material (polymer) 22, see FIG. 2, which is then routed through a conduit 24 to a die block 26 having a spinnerette body 52 secured thereto.

The polymer resin 14 can vary in composition. The polymer resin can be a thermoplastic. The polymer resin 14 can be selected from the group consisting of: polyolefins, polyesters, polyethylene terephthalates, polybutylene terephthalates, polycyclohexylene dimethylene terephthalates, polytrimethylene terephthalates, polymethyl methacrylates, polyamides, nylons, polyacrylics, polystyrenes, polyvinyls, polytetrafluoroethylenes, ultrahigh molecular weight polyethylenes, very high molecular weight polyethylenes, high molecular weight polyethylenes, polyether ether ketones, non-fibrous plasticized celluloses, polyethylenes, polypropylenes, polybutylenes, polymethylpentenes, low-density polyethylenes, linear low-density polyethylenes, high-density polyethylenes, polystyrenes, acrylonitrile-butadiene-styrenes, styrene-acrylonitriles, styrene tri-block and styrene tetra block copolymers, styrene-butadienes, styrene-maleic anhydrides, ethylene vinyl acetates, ethylene vinyl alcohols, polyvinyl chlorides, cellulose acetates, cellulose acetate butyrates, plasticized cellulosics, cellulose propionates, ethyl cellulose, natural fibers, any derivative thereof, any polymer blend thereof, any copolymer thereof or any combination thereof. In addition, the polymer resin 14 can be selected from biodegradable thermoplastics derived from natural resources, such as polylactic acid, poly-3-hydroxybutyrate, polyhydroxyalkanoates, or any blend, copolymer, or combination thereof. Those skilled in the chemical arts may know of other polymers that can also be used to form the Spun-Blown® non-woven web 12. It should be understood that the Spun-Blown® non-woven 12 of this invention is not limited to just those polymers identified above.

The Spun-Blown® non-woven web 12 can be formed from a homopolymer. The Spun-Blown® non-woven web 12 can be formed from polypropylene.

It should be understood that the Spun-Blown® non-woven web 12 can include an additive which can be applied before or after the fibers are collected. Such additives can include, but are not limited to: a superabsorbent, absorbent particulates, polymers, nano-particles, abrasive particulates, active particles, active compounds, ion exchange resins, zeolites, softening agents, plasticizers, ceramic particle pigments, dyes, flavorants, aromas, controlled release vesicles, binders, adhesives, tackifiers, surface modification agents, lubricating agents, emulsifiers, vitamins, peroxides, antimicrobials, deodorizers, flame retardants, anti-foaming agents, anti-static agents, biocides, antifungals, degradation agents, stabilizing agents, conductivity modifying agents, or any combination thereof.

Figure 2:
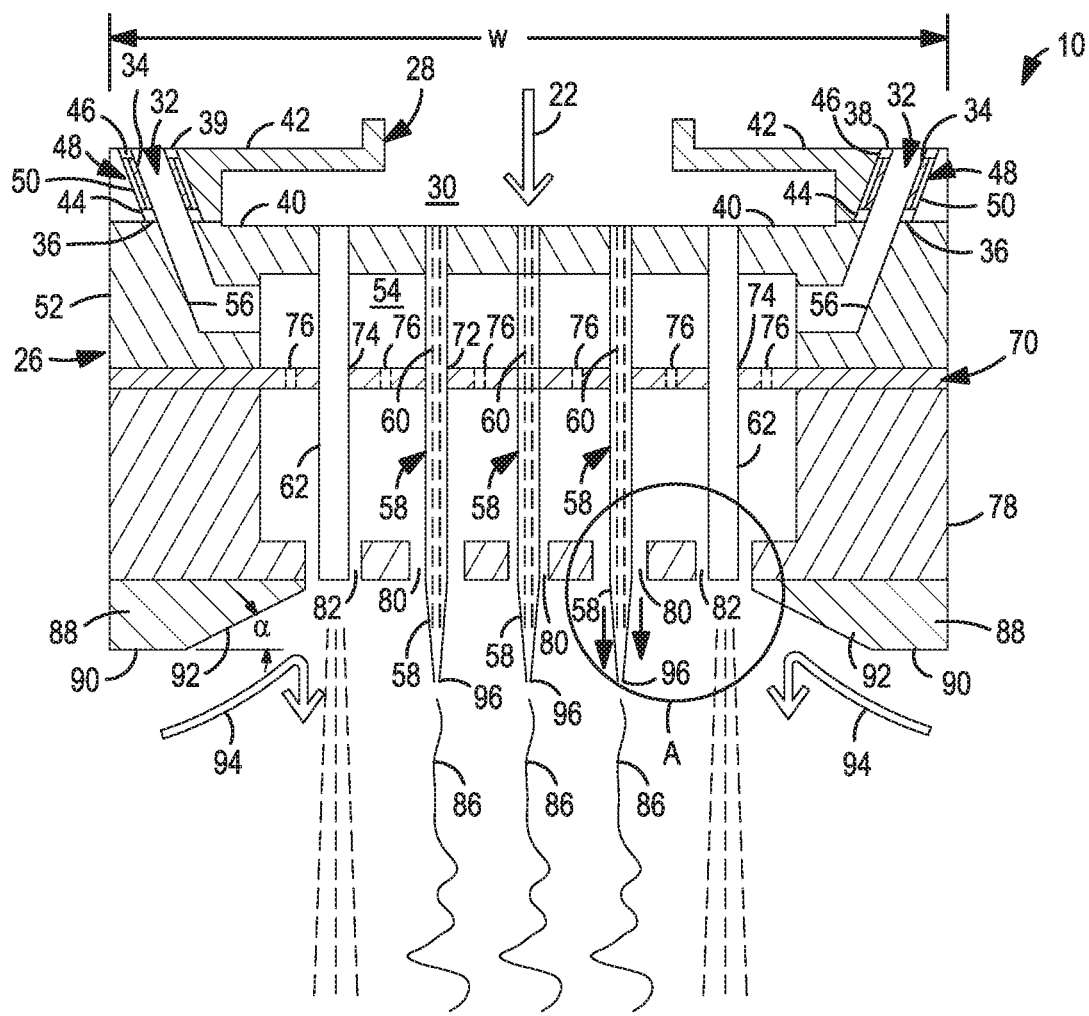
FIG. 2 is a cross-sectional view of a die block, a spinnerette and an exterior plate secured together.

Referring to FIG. 2, a cross-sectional view of a die block 26 and spinnerette body 52 is depicted. The molten material 22 enters the die block 26 through an inlet 28 which communicates with a cavity 30. The cavity 30 can be an enlarged area where the molten material (polymer) is equalized. By "equalize" it is meant to make equal, uniform. Depending upon the size of the die block 26, the cavity 30 can be several inches wide and up to several feet in length. The cavity 30 can contain polymer distribution plates and filter screens (not shown).

Figure 3:
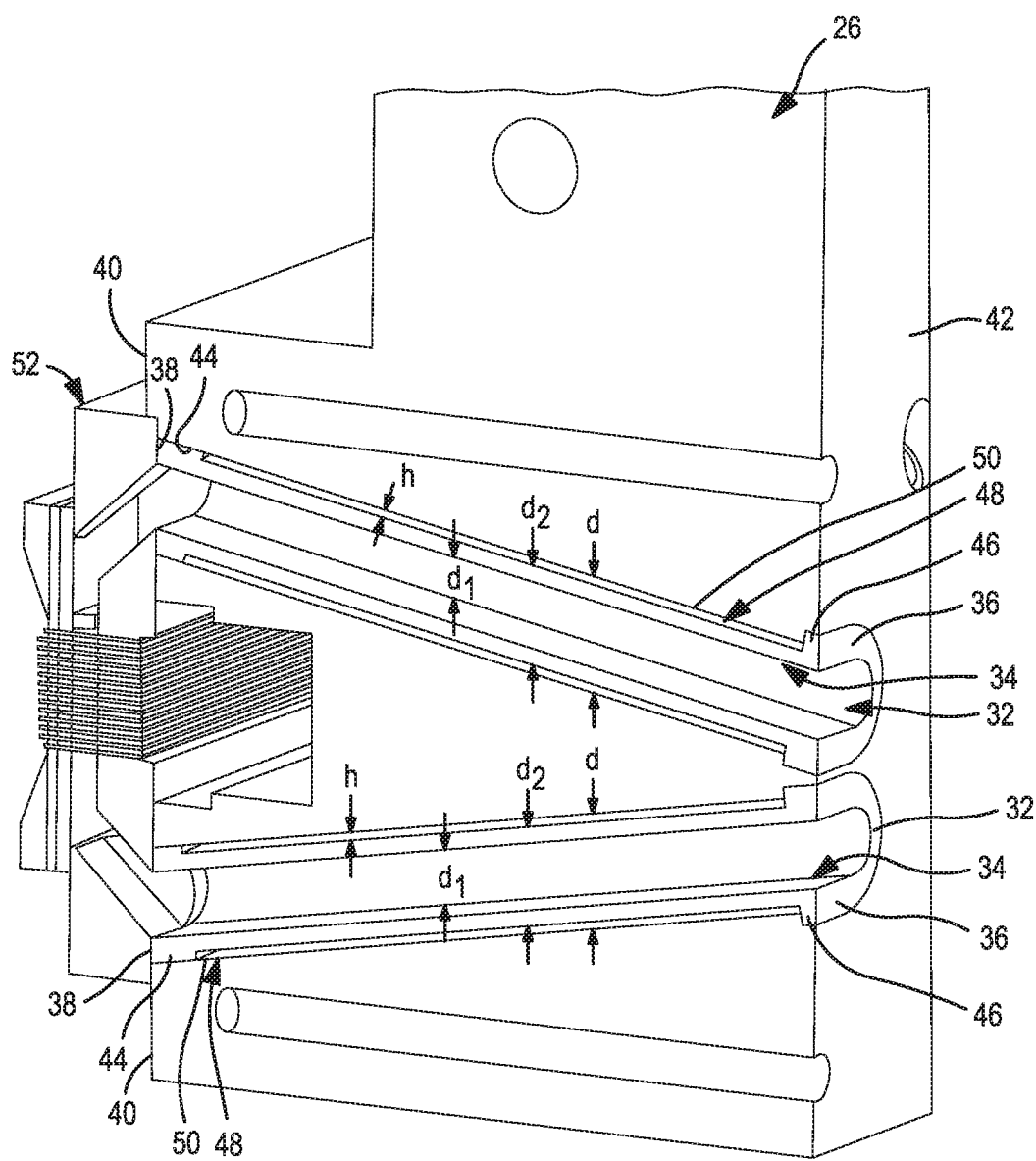
FIG. 3 is a vertical, cross-section of a perspective view of a die block showing a pair of gas passages.

Referring to FIGS. 2 and 3, the die block 26 has one or more gas passages 32 formed therein. A pair of gas passages 32, 32 is shown in FIGS. 2 and 3. Each gas passage 32 has an inside diameter d. The inside diameter d can vary in dimension. The pressurized gas passing through each of the gas passages 32, 32 is usually pressurized air.

It should be understood that in FIG. 3, the pair of gas passages 32, 32 are offset from the inlet 28, and therefore the inlet 28 does not appear in FIG. 3.

Each of the pair of gas passages 32, 32 can vary in diameter, length and configuration. Each of the pair of gas passages 32, 32 can be linear, curved, angled, or have some other unique configuration. It has been found that by positioning a hollow insert 34 in each of the pair of gas passages 32, 32, that one can better control the temperature of the incoming gas. By "gas" it is meant the state of matter distinguished from the solid and liquid states by relatively low density and viscosity and the spontaneous tendency to become distributed uniformly throughout any container; a substance in the gaseous state. In the apparatus 10, a pressurized gas, most likely air, is introduced into the die block 26 and spinnerette body 52. By "air" it is meant a colorless, odorless, gaseous mixture, mainly nitrogen (approximately 78%) and oxygen (approximately 21%) with lesser amounts of other gases.

The insert 34 can be a ceramic insert. By "ceramic" it is meant any of various hard, brittle, heat and corrosion-resistant materials made by shaping and then firing a non-metallic mineral, such as clay, at a high temperature. Alternatively, the insert 34 can be constructed of various other heat resistant materials. Still another option is to coat the insert 34 with a heat resistant coating, such as a ceramic coating. One could also coat the insert 34 with some other material which has good thermal insulation properties.

As best shown in FIG. 3, each of the inserts 34, 34 has an inside diameter $d_1$ and an outside diameter $d_2$. Desirably, the inside diameter $d_1$ is smooth. The inside diameter $d_1$ can vary depending upon the size of the die block 26. Typically, the inside diameter $d_1$ ranges from between about 0.1 inches to about 1 inch. Desirably, the inside diameter $d_1$ is at least 0.25 inches in diameter. More desirably, the inside diameter $d_1$ is at least 0.3 inches in diameter. Even more desirably, the inside diameter $d_1$ is at least 0.4 inches in diameter. Most desirably, the inside diameter $d_1$ is around 0.5 inches.

Each insert 34 has a first end 36 and a second end 38. The first end 36 is spaced apart from the second end 38. The first end 36 is aligned with an exterior surface 42 of the die block 26 and the second end 38 is aligned with an inner surface 40 of the die block 26. The first end 36 contains an outwardly protruding flange 44 and the second end 38 also contains an outwardly protruding flange 46. By "flange" it is meant a protruding rim, edge, rib or collar, as on a pipe shaft, used to strengthen an object, hold it in place or attach it to another object. The structural shape of the flanges, 44 and 46, create a physical chamber 48 in a bore hole 50, which is machined into the die block 26, and in which each insert 34 is fitted. Each of the pair of inserts 34, 34 is fitted into one of the pair of bore holes, 50, 50. The chambers 48, 48 are located between the inside diameter d of each bore hole 50 and the outside diameter $d_2$ of each of the pair of inserts 34, 34. Each chamber 48 extends longitudinally along a portion of the insert 34 between the two flanges, 44 and 46. Desirably, each chamber 48 will extend along a major portion of the outside diameter $d_2$ of each of the pair of inserts 34, 34. Each chamber 48 can be filled with a gas, such as air. Each chamber 48 functions as a thermal insulator that limits heat transfer from the hot, die block 26 to the pressurized gas passing through the inside diameter $d_1$ of each of the pair of inserts 34, 34. Because of this, no cold spots will develop in the die block 26. In addition, the hot die block 26 will not heat up the incoming pressurized gas that is being routed to the spinnerette body 52. The combination of the pair of inserts 34, 34 and the adjacent chambers 48, 48, enable the operator to direct the pressurized gas (air) through the die block 26 without affecting the temperature of either the die block 26 or the incoming pressurized gas (air) significantly. Because of this, much colder pressurized gas (air) can be utilized in this inventive process. This colder pressurized gas (air) can enhance fiber crystallization (solidification of the extruded filaments into fibers) and increase the fiber tensile properties.

Still referring to FIG. 3, the size, shape and configuration of the chambers 48, 48 can vary. Desirably, each of the chambers 48, 48 has a height h ranging from between about 0.01 inches to about 0.3 inches. More desirably, the height h of each chamber 48, 48 can range from between about 0.05 inches to about 0.25 inches. Even more desirably, the height h of each chamber 48, 48 can range from between about 0.1 inches to about 0.2 inches. Most desirably, the height h of each chamber 48, 48 is greater than about 0.12 inches.

The presence of the chambers 48, 48, in combination with the material from which the inserts 34,34 are made of, or coated with, will assure one that the pressurized gas (air) that is routed through the inserts 34, 34 will not be heated a substantial amount due to the temperature of the die block 26. In other words, the inserts 34, 34, in combination with the chambers 48, 48 function to provide thermal insulation and limit heat transfer.

It should be understood that the inside diameter d of each of the bore holes 50, 50 can also be coated with a ceramic coating to provide another layer of heat insulation, if desired.

A die block 26 is constructed out of a mass of metal or steel which is a good conductor of heat. The heavy mass of the die block 26 also causes it to retain any heat that is conveyed to it. The temperature of the die block 26 is elevated above ambient temperature due to the molten material 22 (polymer) flowing through the die block 26 and due to heating cartages (not shown) that prevent the polymer melt from being solidified by the cold ambient air or the process air. By "ambient temperature" it is meant the surrounding temperature, such as room temperature. The melt temperature of the various molten material 22 (polymer) does vary but usually exceeds 100° C. For many polymers, the melt temperature can be as high as 200° C., 250° C., 300° C., 350° C., 400° C., or even higher. By thermally insulating the incoming pressurized gas (air) from the elevated temperature in the die block 26, one can better control the entire process and produce extruded filaments and fibers that are very precise in composition, diameter and strength.

Referring again to FIG. 2, the apparatus 10 also includes a spinnerette body 52. By "spinnerette" it is meant a device for making synthetic fibers, consisting of a plate pierced with holes through which plastic material (polymer) is extruded in filaments. The spinnerette body 52 is secured to the die block 26. The die block 26 and the spinnerette body 52 have essentially the same length and width. Usually the perimeters of each are coterminous. The die block 26 and the spinnerette body 52 each have a generally rectangular configuration. The spinnerette body 52 has a length l, see FIG. 1 and a width w, see FIG. 2. The length l is longer than the width w. The spinnerette body 52 has a gas chamber 54. One or more gas passageways 56, 56 are formed in the spinnerette body 52. A pair of gas passageways 56, 56 is depicted in FIG. 2, with each being connected to one of the pair of gas passages 32, 32. The pair of gas passageways 56, 56 connect the gas chamber 54 to the pair of gas passages 32, 32 so that pressurized gas (air) can be introduced into the gas chamber 54. The source of the pressurized gas (air) is not shown in the drawings but equipment to produce the pressurized gas (air) is well known to those skilled in the arts.

It should be understood that the gas chamber 54 is separate and distinct from the cavity 30 formed in the die block 26. In other words, the gas chamber 54 is isolated from the cavity 30. By "isolate" it is meant to set apart or cut off from others, to render free of external influences; insulate. This means that the molten material 22 is not in contact with the pressurized gas (air) while it is in the cavity 30.

It should be understood that the spinnerette body 52 could be coated with a ceramic coating, if desired.

The apparatus 10 further includes a plurality of nozzles 58. By "nozzle" it is meant a projecting part with an opening, as at the end of a hose, for regulating and directing the flow of a fluid or molten material. Each of the nozzles 58 is secured to the spinnerette body 52. Each of the nozzles 58 is spaced apart from an adjacent nozzle 58. In the spinnerette body 52, the number of nozzles 58 can vary. A spinnerette body 52 can contain from as few as ten nozzles 58 to several thousand nozzles 58. For a commercial size line, the number of nozzles 58 in the spinnerette body 52 can range from between about 1,000 to about 10,000. Desirably, the spinnerette body 52 will have at least about 1,500 nozzles. More desirably, the spinnerette body 52 will have at least about 2,000 nozzles. Even more desirably, the spinnerette body 52 will have at least about 2,500 nozzles. Most desirably, the spinnerette body 52 will have 3,000 or more nozzles.

The size of the nozzles 58 can vary. The size of the nozzles 58 can range from between about 50 microns to about 1,000 microns. More desirably, the size of the nozzles 58 can range from between about 150 microns to about 700 microns. More desirably, the size of the nozzles 58 can range from between about 20 microns to about 600 microns. Nozzles of various size can be used but generally all of the nozzles have the same size.

Figure 4:
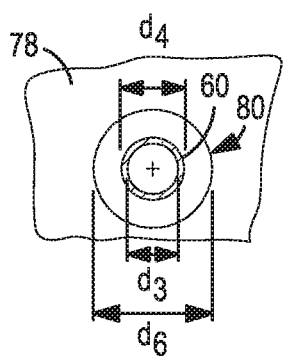
FIG. 4 is an end view of a nozzle surrounded by an opening.
Figure 6:
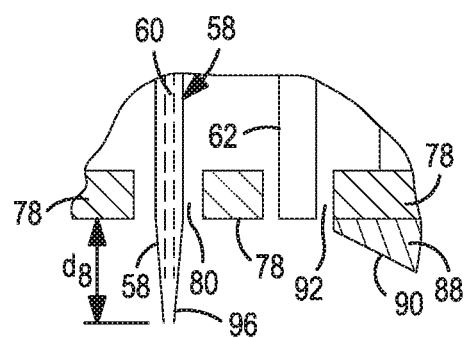
FIG. 6 is a partial exploded view of a portion of the spinnerette within the area labeled A in FIG. 2.

Referring to FIGS. 2, 4 and 6, each of the nozzles 58 can be formed from a metal, such as steel, stainless, a metal alloy, a ferrous metal, etc. Desirably, each of the nozzles 58 is formed from stainless steel. Each of the nozzles 58 is depicted as an elongated, hollow tube 60, see FIGS. 2 and 6. By "tube" it is meant a hollow cylinder, especially one that conveys fluid or functions as a passage. Each of the hollow, cylindrical tubes 60 is open at each end and has a longitudinal central axis and a uniquely shaped inside cross-section. Desirably, the inside cross-section of each tube 60 is circular in shape and constant throughout its length. The length of each of the nozzles 58 can vary. Typically, the length of a nozzle 58 ranges from between about 0.5 to about 3 inches.

It should be understood that the nozzles 58 can be of any geometrical shape, although a circular shape is favored.

Each of the nozzles 58, in the form of a hollow, cylindrical tube 60, has an inside diameter $d_3$ and an outside diameter $d_4$. The inside diameter $d_3$ can range from between about 0.125 millimeters (mm) to about 1.25 mm. The outside diameter $d_4$ of each nozzle 58 should be at least about 0.5 mm. Desirably, the outside diameter $d_4$ of each nozzle 58 can range from between about 0.5 mm to about 2.5 mm.

The molten material 22 (polymer) is extruded through the inside diameter $d_3$ of each nozzle 58. The back pressure on the molten material 22 (polymer), present in each of the hollow, cylindrical tubes 60, should be equal to or exceed about 5 bar. By "bar" it is meant a unit of pressure equal to one million ($10^6$) dynes per square centimeter. Desirably, the back pressure on the molten material 22 (polymer), present in each of the hollow, cylindrical tubes 60, can range from between about 20 bar to about 200 bar depending on the polymer properties and the operating conditions. More desirably, the back pressure on the molten material 22 (polymer), present in each of the hollow, cylindrical tubes 60, can range from between about 25 bar to about 150 bar. Even more desirably, the back pressure on the molten material 22 (polymer), present in each of the hollow, cylindrical tubes 60, can range from between about 30 bar to about 100 bar.

Referring again to FIG. 2, the apparatus 10 also includes a plurality of stationary pins 62. Each of the stationary pins 62 is an elongated, solid member having a longitudinal central axis and an outside diameter $d_5$. Each of the stationary pins 62 is secured to the spinnerette body 52 and usually they have a similar outside diameter to the polymer nozzles 58. The outside diameter $d_5$ of each of the stationary pins 62 should remain constant throughout its length. The dimension of the outside diameter $d_5$ can vary. Desirably, the outside diameter $d_5$ of each of the stationary pins 62 is at least about 0.25 mm. More desirably, the outside diameter $d_5$ of each of the stationary pins 62 is at least about 0.5 mm. Even more desirably, the outside diameter $d_5$ of each of the stationary pins 62 is at least about 0.6 mm. Most desirably, the outside diameter $d_5$ of each of the stationary pins 62 is at least about 0.75 mm.

Figure 7:
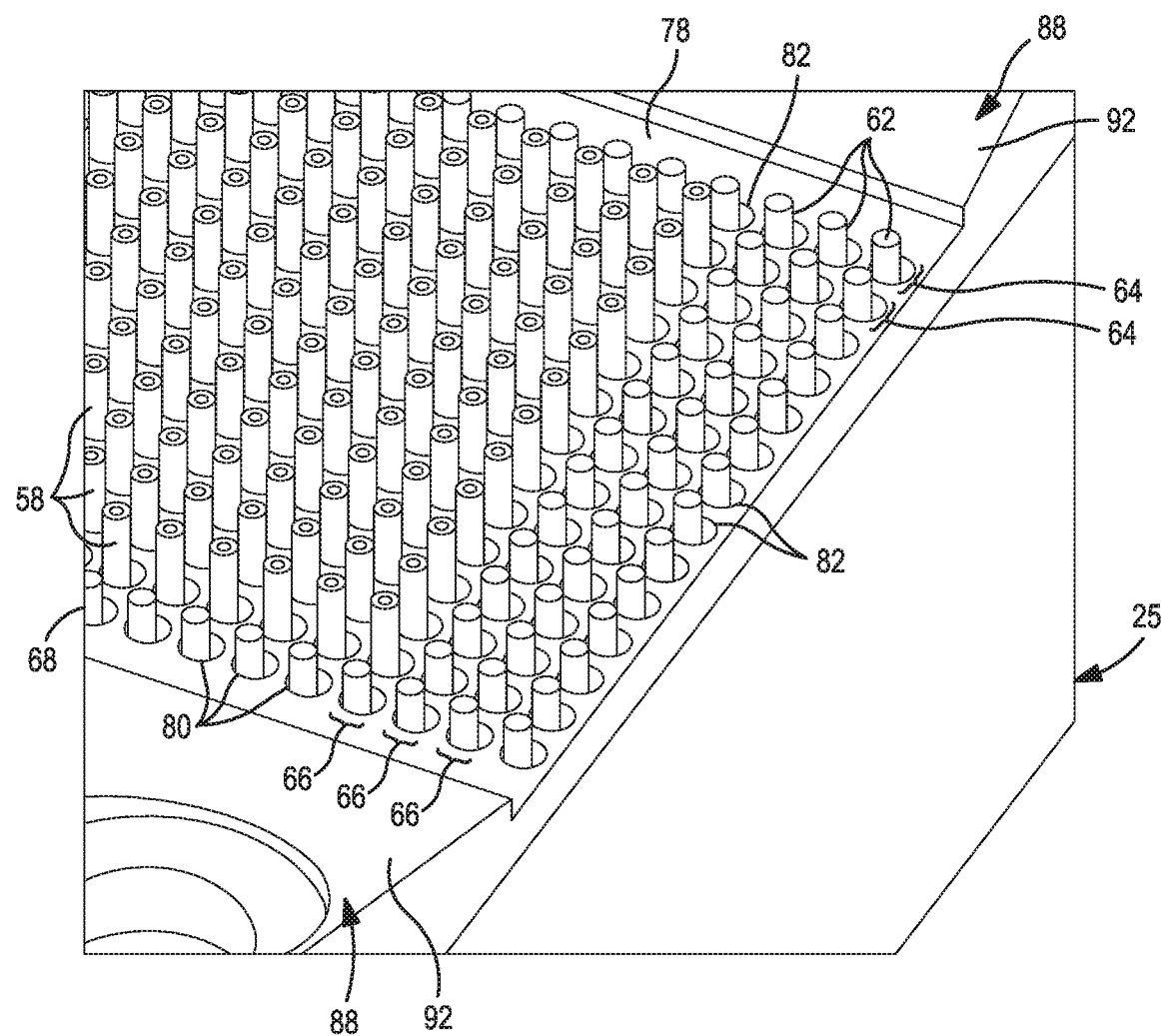
FIG. 7 is a perspective view of an array of nozzles arranged into elongated rows aligned perpendicular to shorter length columns, with the two outside rows consisting of second openings, each of which houses a stationary pin, and the three columns situated adjacent an end of the array consisting of second openings, each of which houses a stationary pin.
Figure 8:
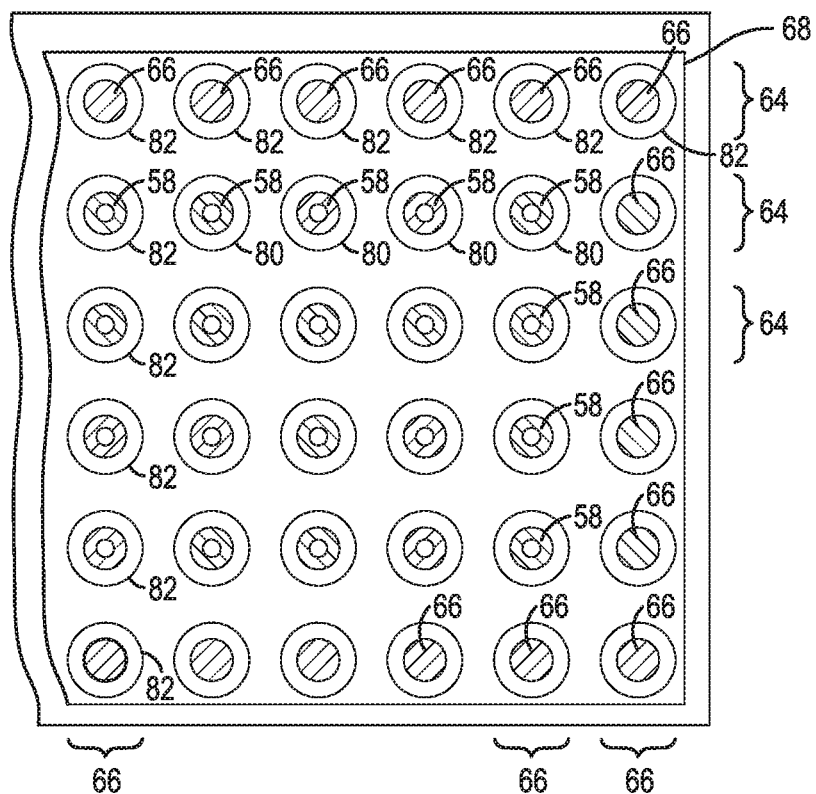
FIG. 8 is a partial cross-sectional view of a portion of a spinnerette body showing a plurality of nozzles flanked by two outside rows and an outermost column containing second enlarged openings, each having a stationary pin secured therein.

Referring now to FIGS. 7 and 8, the plurality of nozzles 58 and the plurality of stationary pins 62 are grouped into an array of a plurality of rows 64 and a plurality of columns 66, having a periphery 68. By "array" it is meant an orderly arrangement. The number of rows 64 can vary as well as the number of columns 66. Typically, the number of rows 64 will range from between about 2 to about 50. Desirably, the number of rows 64 will range from between about 3 to about 30. More desirably, the number of rows 64 will range from between about 4 to about 25. Even more desirably, the number of rows 64 will range from between about 4 to about 20. Most desirably, the number of rows 64 will range from between about 5 to about 16.

Typically, the number of columns 66 will range from about 50 to about 500. Desirably, the number of columns 66 will range from about 60 to about 450. More desirably, the number of columns 66 will range from about 100 to about 300. Even more desirably, the number of columns 66 will range from about 150 to about 250. Most desirably, the number of columns 66 will be greater than 200.

The spinnerette body 52 will have a nozzle density ranging from between about 30 nozzles per centimeter to about 200 nozzles per centimeter. Desirably, the nozzle density will be over 50 nozzles per centimeter. More desirably, the nozzle density will be over 75 nozzles per centimeter. Even more desirably, the nozzle density will be over 100 nozzles per centimeter. Most desirably, the nozzle density will be over 150 nozzles per centimeter.

The polymer throughput through each nozzle 58 is stated in "gram per hole per minute" (ghm). The polymer throughput through each nozzle 58 can range from between about 0.01 ghm to about 4 ghm.

The finished diameter of each of the extruded and attenuated fibers is below about 50 microns. The average fiber diameter can be anywhere in-between about 0.5 microns to about 50 microns, with a standard deviation above 0.5 microns. Desirably, the average fiber diameter is from between about 1 micron to about 50 microns, with a standard deviation above 0.5 microns. More desirably, the average fiber diameter is from between about 1 micron to about 30 microns, with a standard deviation above 0.5 microns. Even more desirably, the average fiber size is from between about 1 micron to about 20 microns, with a standard deviation above 0.5 microns. Most desirably, the average fiber size is from between about 1 micron to about 10 microns, with a standard deviation above 0.5 microns.

The periphery 68 is indicated by a line extending around the outside of the plurality of nozzles 58 and the plurality of stationary pins 62. The rows 64 are shown as being long lines extending horizontally in the apparatus 10 while the columns 66 are shorter in length and are aligned perpendicular to the rows 64. By "perpendicular" it is meant intersecting at or forming a right angle (90 degrees). Although the rows 64 and the columns 66 are shown as being aligned perpendicular to each other, one can certainly use different angular alignments, if desired. The rows 64 and the columns 66 are also depicted as being arranged in parallel rows 64 and parallel columns 66. By "parallel" it is meant being an equal distance apart everywhere. However, one could stagger the rows 64 and/or the columns 66, if desired. The number of rows 64 can vary as can the number of columns 66.

In FIG. 7, one will notice that the two outside rows 64, 64 located adjacent to the two longitudinal sides of the periphery 68 of the array of rows 64 and columns 66, does not contain nozzles 58. In addition, the three columns 66 at the end of the array also do not contain any nozzles 58. One can utilize the stationary pins 62 in as many rows 64 and columns 66, located adjacent to the periphery 68, as desired. Typically, only 1 or 2 rows adjacent to the outer periphery 68 of the array are void of nozzles 58, while from between about 1 to about 50 of the columns 66 can be void of a nozzle 58. The exact number of columns 66 which do not contain the nozzles 58 will depend partly on the overall size of the spinnerette body 52. The reason for not positioning nozzles 58 in such rows 64 and columns 66 is that in a rectangular exterior member 78, see FIG. 2, having about twelve rows 64 and having more than about 150 columns 66, there are simply more columns 66 present. Therefore, one could eliminate more nozzles 58 from the columns 66 than from the rows 64. In addition, by narrowing the array of nozzles 58 in a spinnerette body 52, one can better maintain constant temperature values between the plurality of nozzles 58 being utilized.

As mentioned above, the total number of nozzles 58 and stationary pins 62 that can be secured to the spinnerette body 52 can vary. The larger the size of the spinnerette body 52, the more nozzles 58 and stationary pins 62 that it can support. For a typical commercial spinnerette body 52, it will have several rows 64 and many more columns 66. The number of rows 64 can vary but generally will range from about 4 to about 20. The number of columns 66 can also vary but generally will range from about 50 to about 500. Desirably, a commercial size spinnerette body 52 will have about 8 to about 16 rows and from between about 100 to about 300 columns. For example, a spinnerette body 52 containing a total of 2,496 combined nozzles 58 and stationary pins 62 could have twelve rows 64 and two hundred and eight columns 66.

Figure 9:
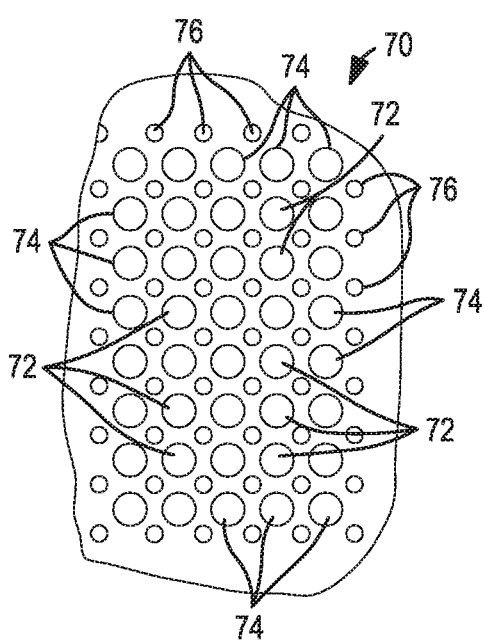
FIG. 9 is to front view of a gas distribution plate.

Referring now to FIGS. 2 and 9, the apparatus 10 further includes a gas distribution plate 70 secured to the spinnerette body 52. The gas distribution plate 70 functions to distribute the pressurized gas (air) equally around each of the nozzles 58 to ensure proper filament attenuation. The gas distribution plate 70 can vary in thickness, configuration and material from which it is formed. Desirably, the gas distribution plate 70 is constructed out of metal or steel. More desirably, the gas distribution plate 70 is constructed out of stainless steel. The gas distribution plate 70 has multiple openings formed therethrough. The multiple openings include a plurality of first openings 72 through which the plurality of nozzles 58 can pass, a plurality of second openings 74 through which the plurality of stationary pins 62 can pass, and a plurality of third openings 76 through which pressurized gas (air) can pass. The exact number of first, second and third openings 72, 74 and 76 can vary depending upon the size of the spinnerette body 52 and the total number nozzles 58 and stationary pins 62 being utilized. The first and second openings, 72 and 74 respectively, must align with the array of nozzles 58 and stationary pins 62 secured to the spinnerette body 52. No extra or unused first and second openings, 72 and 74 respectively, should be formed through the gas distribution plate 70.

The plurality of first, second and third openings, 72, 74 and 76 respectively, are all shown as being circular openings having a predetermined diameter. This assumes that each of the plurality of nozzles 58 and each of the plurality of stationary pins 62 have a circular outside diameter. The geometrical shape of the third openings 76 do not have to be circular, if desired. However, it is much more cost effective to form a circular hole than some other shape and therefore, from a practical point of view, the third openings 76 will also most likely have a circular outside diameter.

Each of the plurality of first openings 72 are sized and configured to match or be slightly larger than the outside diameter $d_4$ of the plurality of nozzles 58. A tight, snug or press fit can be utilized to retain the plurality of nozzles 58 in a set arrangement. Each of the plurality of second openings 74 are sized and configured to match or be slightly larger than the outside diameter $d_5$ of the plurality of stationary pins 62. Again, a tight, snug or press fit can be utilized to retain the plurality of stationary pins 62 in a set arrangement. Each of the plurality of third openings 76 are sized and configured to allow an appropriate amount of pressurized gas (air) to pass through them. The amount of pressurized gas (air) that is needed can be calculated based upon a number of factors, such as the composition of the molten material 22 (polymer) that is being extruded, the number of nozzles 58 and stationary pins 62 that are present, the inside diameter $d_3$ of each of the nozzles 58, the flow rate of the molten material 22 (polymer) passing through each of the nozzles 58, the velocity of the pressurized gas (air) passing through the gas distribution plate 70, etc. By "velocity" it is meant the rapidity or speed of motion, swiftness. Those skilled in the art can easily calculate the amount of pressurized gas (air) that is needed, its velocity and a temperature which is advantageous to running the apparatus 10 at a maximum speed.

Still referring to FIG. 9, one can clearly see that each of the first and second openings, 72 and 74 respectively, can be of the same diameter. Alternatively, the diameter of the first openings 72 can be sized to be smaller or larger than the diameter of the second openings 74. When the outside diameter $d_4$ of each of the plurality of nozzles 58 is the same as the outside diameter $d_5$ of each of the plurality of stationary pins 62, then the diameter of each of the first openings 72 will be equal to the diameter of each of the second openings 74.

One will also notice that in FIG. 9, that the second openings 74 are all located around the outer periphery 68 of the plurality of the first openings 72. By "periphery" it is meant a line that forms the boundary of an area; a perimeter. The reason for this arrangement is that a second shroud or curtain of pressurized gas (air) is obtained which shelters the extruded filaments from the surrounding ambient air. This is a unique feature of the present invention.

Likewise, one can clearly see that each of the third openings 76 is smaller than the outside diameters of either the first openings 72 or the second openings 74. However, if one wished to size the outside diameter of each of the third openings 76 to be larger than or match the outside diameter $d_4$ and $d_5$ of each of the first and second openings, 72 and 74 respectively, this could easily be accomplished, especially if small polymer nozzles 58 are being used. One drawback with making the third openings 76 larger is that the rows 64 and columns 66 would then have to be spaced farther apart. This would limit the total number of nozzles 58 and stationary pins 62 that could be secured to the spinnerette body 52.

Still referring to FIG. 9, one can clearly see that four of the third openings 76 are positioned adjacent to each of the first and second openings, 72 and 74 respectively. The exact number of third openings 76 associated with each of the first and second openings, 72 and 74 can vary. Likewise, the arrangement and angular spacing of the third openings 76 relative to each of the first and second openings, 72 and 74 respectively, can also vary. Furthermore, the distance that each of the third openings 76 is spaced apart from the first and second openings, 72 and 74 respectively, can also vary.

It should be understood that the gas distribution plate 70 could be coated with a ceramic coating, if desired.

Figure 10:
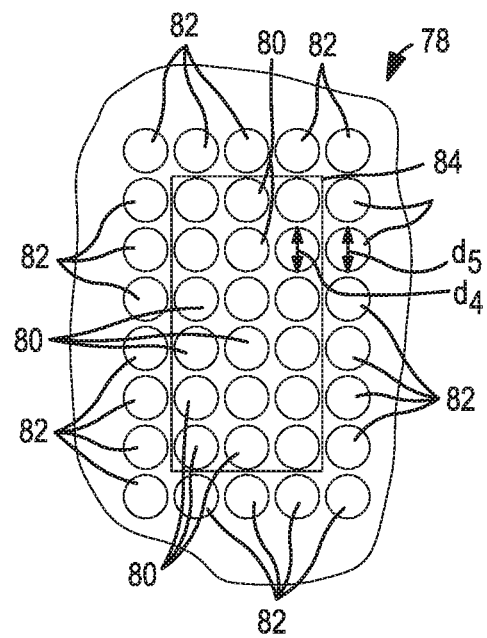
FIG. 10 is a front view of an exterior member.

Referring now to FIGS. 2 and 10, the apparatus 10 further includes an exterior member 78. The exterior member 78 is secured to the gas distribution plate 70 so that it is spaced apart from the spinnerette body 52. The exterior member 78 functions to form annular pressurized gas (air) channels around each of the nozzles 58. The exterior plate 78 can vary in thickness, configuration and material from which it is formed. Desirably, the exterior plate 78 is constructed out of metal or steel. More desirably, the exterior plate 78 is constructed out of stainless steel. The exterior plate 78 has multiple openings formed therethrough, some are first enlarged openings 80, through which one of the nozzles 58 passes, and the remainder are second enlarged openings 82, in which one of the stationary pins 62 is present. Each of the first enlarged openings 80 accommodates a nozzle 58 and each of the second enlarged openings 82 accommodates a stationary pin 62.

It should be understood that the exterior member 78 could be coated with a ceramic coating, if desired.

Referring to FIG. 10, one can clearly see that the second enlarged openings 82 are all located around the outer periphery 84 of the plurality of the first enlarged openings 80. The reason for this arrangement is that it provides a shroud around the periphery 84 of the plurality of nozzles 58 and prevents the surrounding ambient air from contacting the extruded filaments, such that the filaments do not cool too quickly.

Figure 5:
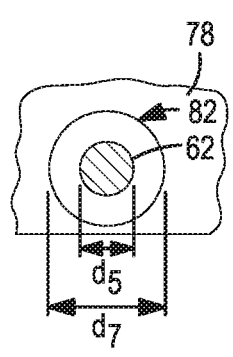
FIG. 5 is an end view of a stationary pin surrounded by an opening.

Referring back to FIGS. 4 and 5, one will also notice that each of the first enlarged openings 80 has an inside diameter $d_6$ and each of the second enlarged openings 82 has an inside diameter $d_7$. The diameter $d_6$ of the first enlarged opening 80 can be equal to the diameter $d_7$ of the second enlarged opening 82. Alternatively, the diameter $d_6$ of the first enlarged opening 80 can be smaller or larger than the diameter $d_7$ of the second enlarged opening 82.

Referring to FIG. 10, the diameter $d_6$ of each of the first enlarged openings 80 is identical to the diameter $d_7$ of each of the second enlarged openings 82. Furthermore, when one compares the first and second openings, 72 and 74 respectively, shown in FIG. 9, to the first and second enlarged openings, 80 and 82 respectively, shown in FIG. 10, one can see that the first and second enlarged openings, 80 and 82 respectively, are much larger. The reason for this is that the pressurized gas (air) will exit through each of the first and second enlarged openings, 80 and 82 respectively, and form a shroud around each of the nozzles 58 and around each of the stationary pins 62. By "shroud" it is meant something that conceals, protects or screens. When the first and second enlarged openings, 80 and 82 respectively, are circles, the shroud of pressurized gas (air) can completely encircle (3600) each of the nozzles 58 and each of the stationary pins 62.

Referring again to FIG. 7, one can see that each of the plurality of nozzles 58 is centrally aligned in each of the first enlarged openings 80. Likewise, each of the plurality of stationary pins 62 is centrally aligned in each of the second enlarged openings 82. The reason for this is that the shroud of pressurized gas (air) will then be evenly distributed around the outer periphery of each of the nozzles 58 and around the outer periphery of each of the stationary pins 62. The pressurized gas (air) shrouds each of the nozzles 58 and assists in causing the extruded molten material 22 (polymer) to solidify and attenuate. In addition, one can see that in the array of nozzles 58 and stationary pins 62, at least one row 64 and at least one column 66 are arranged such that the second enlarged openings 82 are located adjacent to the periphery 84 of the first enlarged openings 80. This means that at least the outside row 64 and at least the outermost column 66, located adjacent to the four sides of the exterior plate 78, will contain only second enlarged openings 82. The reason for this configuration is that it provides a shroud or curtain of pressurized gas (air) around all of the plurality of nozzles 58. This second shroud of pressurized gas (air) will limit or prevent the quick solidification of the filaments which is caused when they are contacted by the surrounding ambient air in the facility where the extruder 20 is housed.

Referring again to FIG. 2, as the pressurized gas exits from each of the first enlarged openings 80, adjacent to the plurality of nozzles 58 at a predetermined velocity, the molten material 22 (polymer) is extruded into filaments 86. Each of the filaments 86 is shrouded by the surrounding pressurized gas from an adjacent filament 86 to prevent roping. By "filament" it is meant a fine or thinly spun material still in a semi-soften state. By this arrangement, contact between adjacent filaments 86, 86 is prevented. In addition, the pressurized gas (air) exiting from each of the plurality of second enlarged openings 82 forms a shroud around all of the extruded filaments 86. This second shroud shelters the semi-molten filaments 86, 86 from the surrounding ambient air and slows down the cooling of the filaments 86, 86. By increasing the time it takes each of the filaments 86 to cool, one can obtain finer diameter fibers 98 and more accurately control the characteristics of each fiber 98. This feature of using a double shroud plus a second stage of fiber attenuation using an aspirator, which will be explained below, is very unique.

Still referring to FIGS. 2 and 7, the apparatus 10 further includes a pair of cover strips 88, 88 secured to the exterior member 78. Each of the pair of cover strips 88, 88 consists of a separate and distinct member that is spaced apart from the other member. Alternatively, the pair of cover strips 88, 88 could be manufactured as a single member. Each of the pair of cover strips 88, 88 is shown as having an exterior surface 90, 90. Each of the pair of cover strips 88, 88 extend along the length l of the spinnerette body 52. As shown, each of the pair of cover strips 88, 88 is aligned parallel to one another. Each of the external surfaces 90, 90 can have a beveled portion 92. The beveled portion 92 extends downward and inward from the exterior surface 90. By "beveled" it is meant the angle or inclination of a line or surface that meets another at any angle but 90°. The beveled surfaces 92, 92 extend longitudinally along the length l of the spinnerette body 52. The angle α of each of the beveled surfaces 92, 92 can vary. Desirably, the each beveled surface 92, 92 is formed at an angle α (see FIG. 2) which can range from between about 15° to about 75°.

Still referring to FIG. 2, the pair of cover strips 88, 88 can be formed from a metal, such as steel, stainless, a metal alloy, a ferrous metal, etc. Desirably, the pair of cover strips 88, 88 is formed from stainless steel. The pair of cover strips 88, 88 facilitates the flow of ambient air around the pressurized gas exiting at least some of the second enlarged openings 82. The pair of cover strips 88, 88 will direct the flow of ambient air around the lower portion of the exterior member 78 such that this air will move according to the directions indicated by the arrows 94, 94. The ambient air will follow the directions of the beveled surfaces 92, 92 and then be turned downward away from the plurality of nozzles 58 by the exiting pressurized gas (air) forcefully exiting the second enlarged openings 82. The exiting pressurized gas (air) is coming from the gas chamber 54 via the third openings 76 formed in the gas distribution plate 70 and via the second enlarged openings 82 formed in the exterior member 78.

The pair of cover strips 88, 88 also functions to redistribute the clamping force exerted on the exterior member 78 and the gas distribution plate 70 to secure them to the spinnerette body 52. The pair of cover strips 88, 88 also function to protect the nozzles 58 from the entrained air in the room that may be drawn in from the sides and which could have a cooling effect on the outer rows.

Referring now to FIGS. 2 and 6, the molten material 22 (polymer) present in the cavity 30 of the die block 26 is forced downward through the plurality of nozzles 58 and flows through the hollow cylindrical tubes 60. Each nozzle 58 has a terminal end 96 which is located below the plane of the exterior member 78. Desirably, each terminal end 96 is located below the plane of the exterior surface 90 of the pair of cover strips 88, 88. Each nozzle 58 extends downward beyond the first enlarged opening 80 by a vertical distance $d_8$, see FIG. 6. The distance $d_8$ can vary. Desirably, the distance $d_8$ should be at least about 1 mm. More desirably, the distance $d_8$ is at least about 2 mm. Even more desirably, the distance $d_8$ is at least about 3 mm. Most desirably, the distance $d_8$ is at least about 5 mm.

Referring to FIG. 2, the molten material 22 (polymer) exits each of the plurality of nozzles 58 as filaments 86. Each of the filaments 86 is isolated by the pressurized gas (air) exiting from the first enlarged openings 80. This pressurized gas (air) provides a shroud or veil which limits a filament 86 from contacting, touching and/or bonding to an adjacent filament 86 and forming ropes and/or bundles. By "veil" it is meant something that conceals, separates or screens like a curtain. The velocity and pressure at which the filaments 86 exit the plurality of nozzles 58 can be varied to suit one's equipment and to form fibers 98, see FIG. 1, which meet certain fiber criteria, such as a particular diameter, composition, strength, etc.

The temperature of the pressurized gas (air) used in shrouding and attenuating the filaments 86 at or near the nozzles 58 can be at a lower temperature, the same temperature, or at a higher temperature, than the melt temperature of the passing filaments 86. Desirably, the temperature of the pressurized gas (air) used in shrouding and attenuating the filaments 86 at or near the nozzles 58 is at a temperature ranging from between about 0° C. to about 250° C. colder or hotter than the melt temperature of the filaments 86. More desirably, the temperature of the pressurized gas (air) used in shrouding and attenuating the filaments 86 at or near the nozzles 58 is at a temperature ranging from between about 0° C. to about 200° C. colder or hotter than the melt temperature of the filaments 86. Even more desirably, the temperature of the pressurized gas (air) used in shrouding and attenuating the filaments 86 at or near the nozzles 58 is at a temperature ranging from between about 0° C. to about 150° C. colder or hotter than the melt temperature of the filaments 86. Most desirably, the temperature of the pressurized gas (air) used in shrouding and attenuating the filaments 86 at or near the nozzles 58 is at a temperature ranging from between about 0° C. to about 100° C. colder or hotter than the melt temperature of the filaments 86.

The pressurized gas (air) emitted through the multiple second openings 82 will form pressurized gas (air) streams which will limit or prevent the plurality of filaments 86 from being contacted by the surrounding ambient air. Desirably, this pressurized gas (air) can form an envelope, shroud or curtain around the entire circumference or periphery 84 of the total number of filaments 86. The velocity and pressure at which the filaments 86 exit the plurality of nozzles 58 can be varied to suit one's equipment and to form fibers 98, see FIG. 1, which meet certain fiber criteria, such as a particular diameter, composition, strength, etc.

Figure 11:
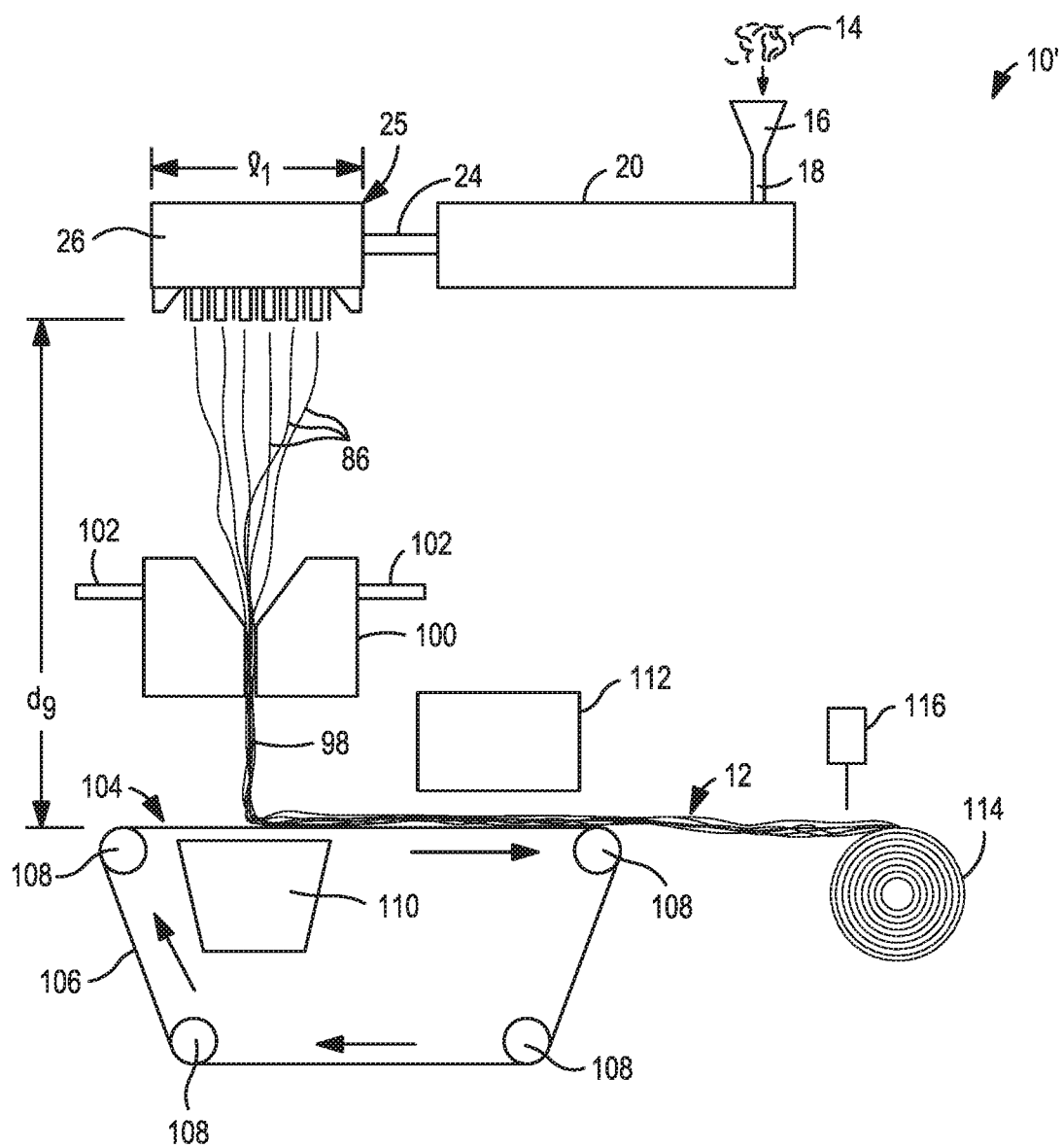
FIG. 11 is a schematic of an alternative process for forming a Spun-Blown® non-woven web.

Referring now to FIG. 11, an alternative apparatus 10' is shown which includes an aspirator 100. The aspirator 100 is located downstream of the terminal end 96 of each of the nozzles 58. By "aspirator" it is meant a device for producing high speed gas (air) jets to drag and attenuate the filaments 86. The aspirator 100 is vertically aligned downstream of the plurality of filaments 86 such that the plurality of filaments 86 can easily pass therethrough. Pressurized gas (air) is introduced into the aspirator 100 via one or more conduits 102. A pair of conduits 102, 102 is depicted in FIG. 11. The number of conduits 102 can vary from 1 to several. The incoming pressurized gas (air) entering the aspirator 100 is aligned parallel to the flow direction of the filaments 86. This parallel gas (air) flow feature is important as parallel gas (air) jets will exert drag force on the filaments 86 causing them to be under tension which will result in drawing the filaments 86 into fibers 98. The incoming pressurized air to the aspirator 100 can be chilled, be at room temperature, or be heated. Typically, the incoming air is at room temperature or slightly higher. As the filaments 86 pass through the aspirator 100, they are attenuated into fibers 98 by the pressurized gas (air) travelling through the aspirator 100 at a velocity that is at least twice as great as the velocity of the pressurized gas (air) exiting the plurality of first and second enlarged openings, 80 and 82 respectively. By "attenuate" it is meant to make slender, fine or small. Desirably, the pressurized gas (air) used to attenuate the filaments 86 into fibers 98 is moving at a velocity that is at least 2.5 times greater than the velocity of the pressurized gas (air) exiting the plurality of first and second enlarged openings, 80 and 82 respectively. More desirably, the pressurized gas (air) used to attenuate the filaments 86 into fibers 98 is moving at a velocity that is at least 5 times greater than the velocity of the pressurized gas (air) exiting the plurality of first and second enlarged openings, 80 and 82 respectively. Even more desirably, the pressurized gas (air) used to attenuate the filaments 86 into fibers 98 is moving at a velocity that is at least 10 times greater than the velocity of the pressurized gas (air) exiting the plurality of first and second enlarged openings, 80 and 82 respectively. Most desirably, the pressurized gas (air) used to attenuate the filaments 86 into fibers 98 is moving at a velocity that is more than 10 times as great as the velocity of the pressurized gas (air) exiting the plurality of first and second enlarged openings, 80 and 82 respectively. For example, the pressurized air used to attenuate the filaments 86 into fibers 98 can have a velocity of at least about 50 meters per second (m/s), about 100 m/s, 200 m/s, about 250 m/s, about 300 m/s, about 400 m/s or greater.

The aspirator 100 functions as a second stage to attenuate the filaments 86 so that they acquire similar strength properties to fibers formed using conventional spunbond technology.

Referring back to FIG. 1, it should be noted that when an aspirator 100 is not present, slightly heated gas (air) is used to achieve high fiber attenuation at or near the terminal end 96 of each of the nozzles 58. The produced fibers 98 tend to be weaker than conventional spunbond fibers but are still much stronger than conventional meltblown fibers. This is especially true when the temperature of the pressurized gas (air) is around 50° C. to about 100° C. lower than the polymer melt temperature. The inventive apparatus and process taught herein is very versatile and is easily adjusted to fabricate spunmelt fibers 98 having a wide range of properties. Such properties span the distance between conventional meltblown fibers to conventional spunbond fibers.

Referring again to FIG. 11, the number of fibers 98 exiting the aspirator 100 will be equal to the number of filaments 86 which enter the aspirator 100. However, the fibers 98 will have a smaller diameter than the diameter of each filament 86. In addition, the fibers 98 will generally be stronger than the filaments 86. The diameter of each fiber 98 will be partially dictated by the amount that each filament 86 is attenuated in the aspirator 100. As the fibers 98 exit the aspirator 100, they are directed downward and collected on a moving surface 104.

Referring to FIGS. 1 and 11, the moving surface 104 can vary in design and construction. For example, the moving surface 104 can be a movable, closed loop forming wire 106 mounted and supported by two or more rollers 108. One of the rollers 108 can be a drive roller. Four rollers 108 are shown in FIGS. 1 and 11. The moving surface 104 can rotate clockwise or counter clockwise. Alternatively, the moving surface 104 could be a conveyor belt, a rotatable drum, a forming drum, a dual drum collector, or any other mechanism known to those skilled in the art.

The moving surface 104 can be operated at room temperature, especially when the forming wire 106 or conveyor belt is constructed from polyethylene terephthalate (PET) material. However, when the moving surface 104 is constructed from metal or steel wire, or is covered with metal belts, it can be heated slightly to impose specific textures or patterns that may enhance the characteristics of the Spun-Blown® non-woven web 12.

The moving surface 104 can move at varying speeds that can influence the composition, density, integrity, etc. of the finished Spun-Blown® non-woven web 12. For example, as the speed of the moving surface 104 is increased, the loft or thickness of the Spun-Blown® non-woven web 12 will decrease.

Still referring to FIGS. 1 an 11, the apparatus 10 or 10' further includes a vacuum chamber 110 positioned adjacent to the moving surface 104. As depicted, the vacuum chamber 110 is positioned below the forming wire 106. The vacuum chamber 110 applies a vacuum or suction to the plurality of randomly collected fibers 98 that form the Spun-Blown® non-woven web 12. This vacuum will pull the process gas (air) and the ambient air away from the Spun-Blown® non-woven web 12 and will also limit or prevent the fibers 98 from flying around and thereby enhances uniformity of the non-woven web 12. Various kinds of vacuum chambers 110 can be used. The amount of vacuum applied can be varied to suit one's particular needs. Those skilled in the art are well aware of the type of vacuum equipment that can perform this function.

Downstream of the vacuum chamber 110 is a bonder 112. The bonder 112 can vary in design. The bonder 112 can be a mechanical bonder, a hydro-mechanical bonder, a thermal bonder, a chemical bonder, etc. The bonder 112 is optional but for most Spun-Blown® non-woven webs 12 formed from very thin, randomly oriented fibers, the bonding step can provide added strength and integrity.

It should be understood that the Spun-Blown® non-woven web 12 can be subjected to other mechanical or chemical treatment, if desired. For example, the Spun-Blown® non-woven web 12 could be hydroentangled, be perforated, be cut, be slit, be punched, be stamped, be embossed, be printed, be coated, etc. After the bonder 112, if no other treatments are desired, the Spun-Blown® non-woven web 12 can be wound up on a supply roll 114. A cutter 116 can be used to cut, divide, sever or slit the Spun-Blown® non-woven web 12 at an appropriate length and/or width.

Referring again to FIG. 1, a distance $d_9$ is shown which is measured from the terminal tip 96 of each of the nozzles 58 to the moving surface 104. This distance do is referred to those in the art as a "Die to Collector Distance" (DCD). This DCD can vary depending on the type of equipment used, the type of fibers 98 being formed, the operating conditions of the apparatus 10 or 10', the polymer material 22 (polymer) being extruded, the properties in the finished Spun-Blown® non-woven web 12, etc. Generally, the DCD can range from between about 10 centimeters (cm) to about 150 cm. Desirably, the DCD can range from between about 20 centimeters (cm) to about 125 cm.

Process

The process for forming a Spun-Blown® non-woven web 12 will be explained with reference to FIGS. 1, 2 and 11. The process includes the steps of forming a molten material 22 (polymer) and directing the molten material (polymer) through a die block 26. The molten material 22 (polymer) can be a homopolymer or two different polymers with each being directed to a certain group of nozzles 58. Desirably, the molten material 22 (polymer) is polypropylene. The molten material 22 (polymer) is heated to a temperature of at least about 170° C. upstream of the die block 26, usually in an extruder 20. The die block 26 has a cavity 30 and an inlet 28 connected to the cavity 30. The inlet 28 conveys a molten material 22 into the die block 26. The die block 26 also has one or more gas passages 32, 32 formed therethrough for conveying pressurized gas (air) to the spinnerette body 52. Each of the gas passages 32, 32, two being shown, has an inside diameter d. An insert 34 is positioned in each of the gas passages 32, 32. Each insert 34, 34 has an inside diameter $d_1$ and an outside diameter $d_2$. A major portion of the outside diameter $d_2$ of each insert 34, 34 is smaller than the inside diameter d of each of the gas passages 32, 32 to form a chamber 48 therebetween. A spinnerette body 52 is secured to the die block 26. The spinnerette body 52 has a gas chamber 54 and one or more gas passageways 56, 56, two being shown, which connect the gas chamber 54 to the gas passage s 32, 32. The spinnerette body 52 has a plurality of nozzles 58 and a plurality of stationary pins 62 secured thereto which are grouped into an array of a plurality of rows 64 and a plurality of columns 66, having a periphery 68.

A gas distribution plate 70 is secured to the spinnerette body 52. The gas distribution plate 70 has a plurality of first, second and third openings, 72, 74 and 76 respectively, formed therethrough. Each of the first openings 72 accommodates one of the nozzles 58, each of the second openings 74 accommodates one of the stationary pins 62, and each of the third openings 76 is located adjacent to the first and second openings, 72 and 74 respectively.

An exterior member 78 secured to the gas distribution plate 70, away from the spinnerette body 52. The exterior member 78 has a plurality of first and second enlarged openings, 80 and 82 respectively, formed therethrough. Each of the first enlarged openings 80 surrounds one of the nozzles 58 and each of the second enlarged openings 82 surrounds one of the stationary pins 62. The array of nozzles 58 and stationary pins 62 has at least one row 64 and at least one column 66, which are located adjacent to the periphery 68, being made up of the second enlarged openings 82.

The process also includes directing pressurized gas (air) through the plurality of first, second and third openings, 72, 74 and 76 respectively, formed in the gas distribution plate 70. The molten material 22 (polymer) is extruded through each of the nozzles 58 to form multiple filaments 86. At least a portion of each of the multiple filaments 86 is then shrouded by the pressurized gas (air) emitted through the first enlarged openings 80, formed in the exterior member 78, at a predetermined velocity. The pressurized gas (air) exiting the second enlarged openings 82, formed in the exterior member 78, is used to isolate all of the filaments 86 from surrounding ambient air.

Upon being extruded out the terminal end 96 of each of the nozzles 58, the filaments 86 start to solidify and are attenuated by the exiting pressurized gas (air) into fibers 98. An optional, second stage of attenuation can be accomplished using an aspirator 100, see FIG. 11. When the aspirator 100 is utilized, the pressurized gas (air) in the aspirator 100 has a velocity which is at least twice (two time greater than) the velocity of the pressurized gas exiting the first and second enlarged openings, 80 and 82 respectively. Desirably, the pressurized gas (air) in the aspirator 100 has a velocity which is at least five times greater than the velocity of the pressurized gas exiting the first and second enlarged openings, 80 and 82 respectively. More desirably, the pressurized gas (air) in the aspirator 100 has a velocity which is at least ten times greater than the velocity of the pressurized gas exiting the first and second enlarged openings, 80 and 82 respectively. The filaments 86 are attenuated by the pressurized gas (air) which is directed essentially parallel to the direction of flow of the filaments 86. This is important because in other processes, especially in a conventional spunbond process, the attenuating gas (air) is directed at the filaments at a steep angle. By keeping the attenuating gas (air) essentially parallel to the flow direction of the filaments 86, one can attenuate multiple rows and columns of the filaments 86 into fibers 98 having unique properties and characteristics. Two of these unique characteristics include forming small or fine diameter fibers 98, and forming fibers 98 which are much stronger than conventional meltblown fibers. The fibers 98 are usually extruded as continuous fibers.

The fibers 98 are collected on a moving surface 104 to form a Spun-Blown® non-woven web 12. The moving surface 104 can be a forming wire 106, a conveyor belt, a rotating drum, a drum collector, a dual drum collector, etc.

The process can also include the step of subjecting the Spun-Blown® non-woven web 12, while it is positioned on the moving surface 104, to a vacuum so as to remove process gas and ambient air, as well as limiting the fibers 98 from flying around and thereby enhances web uniformity. The vacuum can be supplied by a vacuum chamber 110 located adjacent to the moving surface 104. Desirably, the vacuum chamber 110 is situated below the moving surface 104.

The process can further include the additional step of bonding the Spun-Blown® non-woven web 12. The bonder 112 can be located downstream of the vacuum chamber 110 or downstream of the location where the fibers 98 contact the moving surface 104. The bonder 112 functions to bond individual spots, zones, lines, areas, etc. of the Spun-Blown® non-woven web 12 so as to increase the integrity of the Spun-Blown® non-woven web 12. A cutter 116 can be positioned downstream of the bonder 112. The cutter 116 serves to cut, sever, slit or separate one section of the Spun-Blown® non-woven web 12 from an adjacent section. The cutter 116 can be any kind or type of cutting mechanism known to those skilled in the art.

Lastly, the process can include rolling up the finished Spun-Blown® non-woven web 12 onto a supply roll 114 such that it can be shipped to a manufacturing site or location where the Spun-Blown® non-woven web 12 can be utilized. The Spun-Blown® non-woven web 12 can be used in a variety of products and for numerous applications. Fine diameter fibers having good strength properties are especially desired for use in various kinds of absorbent products, such as diapers, feminine napkins, panty liners, training pants, incontinent garments, etc. Fine diameter fibers having good strength properties can also be used in filtration products, acoustic insulation, thermal insulation, wipes, etc. The fibers 98 can further be used in a variety of products.

Spun-Blown® Non-Woven Web

A total of ten (10) different samples of Spun-Blown® non-woven webs 12 were tested. The results are shown in Table 1 below. The basis weight of each of the ten samples differed from between 1 grams per square meter (gsm) and 100 gsm. The average fiber diameter of the ten samples ranged from between 3.09 microns to 10.15 microns.

TABLE 1

| | Sample Name | Basis Weight (gsm) | Average Fiber Dia. μ | Tensile Strength (MD) (g) | Ratio of Tensile Strength (MD) to Basis Wt. | Elongation (MD) (%) | Ratio of % Elongation (MD) to Fiber Dia. | Tensile Strength (CD) (g) | Ratio of Tensile Strength (CD) to Basis Wt. | Elongation (CD) (%) | Ratio of % Elongation (CD) to Fiber Dia. |
|---|---|---|---|---|---|---|---|---|---|---|---|
| 1 | 062717-2.1 | 1 | 3.09 | 20 | 20 | 109 | 35.2 | 16 | 16 | 88 | 28.4 |
| 2 | 062717-2.2 | 3 | 2.26 | 88 | 29.33 | 80 | 35.39 | 42 | 14 | 110 | 48.67 |
| 3 | 062717-1.2 | 10 | 10.15 | 388 | 38.8 | 262 | 25.81 | 210 | 20.68 | 315 | 31.03 |
| 4 | S12 | 20 | 6.56 | 915 | 45.75 | 268 | 40.85 | 469 | 23.45 | 219 | 36.43 |
| 5 | 062717-1.1 | 20 | 10.15 | 899 | 44.95 | 289 | 28.47 | 498 | 24.90 | 294 | 28.9 |
| 6 | 062717-1.3 | 30 | 10.15 | 1278 | 42.6 | 300 | 29.55 | 800 | 26.66 | 316 | 31.13 |
| 7 | S09 R | 38 | 5.10 | 1590 | 41.84 | 182 | 35.68 | 1039 | 27.34 | 233 | 45.68 |
| 8 | 062717-1.4 | 50 | 10.15 | 2302 | 46.04 | 335 | 33 | 1187 | 23.74 | 291 | 28.66 |
| 9 | 062717-1.5 | 75 | 10.15 | 3345 | 44.6 | 381 | 37.53 | 1942 | 25.89 | 370 | 36.45 |
| 10 | 062717-1.6 | 100 | 10.15 | 4140 | 41.4 | 285 | 28.07 | 2441 | 24.41 | 358 | 35.27 |

The Spun-Blown® non-woven web 12, produced on the apparatus 10 described above, contains a plurality of fibers 98 formed from a single molten material 22 (a polymer). Desirably, the molten material 22 is a homopolymer. More desirably, the molten material 22 is polypropylene. Alternatively, the Spun-Blown® non-woven web 12 could be formed from two or more different polymer resins. Furthermore, the Spun-Blown® non-woven web 12 could contain bicomponent fibers.

The Spun-Blown® non-woven web 12 has an average fiber diameter which ranges from between about 0.5 microns to about 50 microns. Desirably, the average fiber diameter ranges from between about 1 micron to about 30 microns. More desirably, the average fiber diameter ranges from between about 1 micron to about 20 microns. Even more desirably, the average fiber diameter ranges from between about 1 micron to about 15 microns. Most desirably, the average fiber diameter ranges from between about 1 micron to about 11 microns. The standard deviation for the average fiber diameter should be above 0.5 microns.

The non-woven web 12 has a basis weight of at least about 0.5 grams per square meter (gsm). Desirably, the Spun-Blown® non-woven web 12 has a basis weight of at least about 1 gsm. More desirably, Spun-Blown® non-woven web 12 has a basis weight of from between about 1 gsm to about 100 gsm. Even more desirably, Spun-Blown® non-woven web 12 has a basis weight of from between about 1 gsm to about 75 gsm. Most desirably, the non-woven web 12 has a basis weight of from between about 1 gsm to about above 50 gsm.

The Spun-Blown® non-woven web 12 has a tensile strength, measured in a machine direction (MD) in grams (g). The tensile strength ranges from between about 20 g to about 4,200 g. When measuring tensile strength, a sample web measuring about 1 inch by about 6 inches is mounted in a tester and the force needed to break the web is recorded in grams. Desirably, the Spun-Blown® non-woven web 12 has a tensile strength, measured in a machine direction (MD), which ranges from between about 20 g to about 4,140 g. More desirably, the Spun-Blown® non-woven web 12 has a tensile strength, measured in a machine direction (MD), which ranges from between about 80 g to about 3,500 g. Even more desirably, the Spun-Blown® non-woven web 12 has a tensile strength, measured in a machine direction (MD), which ranges from between about 85 g to about 3,400 g. Most desirably, the Spun-Blown® non-woven web 12 has a tensile strength, measured in a machine direction (MD), which ranges from between about 88 g to about 3,350 g.

The Spun-Blown® non-woven web 12 has a tensile strength, measured in a cross direction (CD) in grams (g). The tensile strength ranges from between about 10 g to about 2,500 g. When measuring tensile strength, a sample web measuring about 1 inch by about 6 inches is mounted in a tester and the force needed to break the web is recorded in grams. Desirably, the Spun-Blown® non-woven web 12 has a tensile strength, measured in a cross direction (CD), which ranges from between about 15 grams to about 2,480 g. More desirably, the Spun-Blown® non-woven web 12 has a tensile strength, measured in a cross direction (CD), which ranges from between about 16 g to about 2,460 g. Even more desirably, the Spun-Blown® non-woven web 12 has a tensile strength, measured in a cross direction (CD), which ranges from between about 20 grams to about 2,450 g. Most desirably, the Spun-Blown® non-woven web 12 has a tensile strength, measured in a cross direction (CD), which ranges from between about 40 grams to about 2,441 g.

The Spun-Blown® non-woven web 12 also has a ratio of tensile strength, measured in the machine direction (MD), to basis weight of at least about 20:1. Desirably, the ratio of tensile strength, measured in the machine direction (MD), to basis weight ranges from between about 20:1 to about 50:1. More desirably, the ratio of tensile strength, measured in the machine direction (MD), to basis weight ranges from between about 20:1 to about 48:1. Even more desirably, the ratio of tensile strength, measured in the machine direction (MD), to basis weight ranges from between about 20:1 to about 46:1. Most desirably, the ratio of tensile strength, measured in the machine direction (MD), to basis weight ranges from between about 20:1 to about 45:1.

The Spun-Blown® non-woven web 12 also has a ratio of tensile strength, measured in the cross direction (CD), to basis weight of at least about 10:1. Desirably, the ratio of tensile strength, measured in the cross direction (CD), to basis weight ranges from between 12:1 to about 75:1. More desirably, the ratio of tensile strength, measured in the cross direction (CD), to basis weight ranges from between about 13:1 to about 72:1. Even more desirably, the ratio of tensile strength, measured in the cross direction (CD), to basis weight ranges from between about 14:1 to about 71:1. Most desirably, the ratio of tensile strength, measured in the cross direction (CD), to basis weight ranges from between about 15:1 to about 70:1.

The Spun-Blown® non-woven web 12 further has a percent elongation, measured in the machine direction (MD), of from between about 50% to about 400%. Desirably, the Spun-Blown® non-woven web 12 has a percent elongation, measured in the machine direction (MD), of from between about 70% to about 395%. More desirably, the Spun-Blown® non-woven web 12 has a percent elongation, measured in the machine direction (MD), of from between about 75% to about 390%. Even more desirably, the Spun-Blown® non-woven web 12 has a percent elongation, measured in the machine direction (MD), of at least about 80%.

The Spun-Blown® non-woven web 12 has a percent elongation, measured in the cross direction (CD), of from between about 50% to about 400%. Desirably, the Spun-Blown® non-woven web 12 has a percent elongation, measured in the cross direction (CD), of from between about 70% to about 395%. More desirably, the Spun-Blown® non-woven web 12 has a percent elongation, measured in the cross direction (CD), of from between about 75% to about 390%. Even more desirably, the Spun-Blown® non-woven web 12 has a percent elongation, measured in the cross direction (CD), of at least about 80%.

The Spun-Blown® non-woven web 12 further has a ratio of percent elongation, measured in the machine direction (MD), to fiber diameter of at least about 15. Desirably, the Spun-Blown® non-woven web 12 has a ratio of percent elongation, measured in the machine direction (MD), to fiber diameter of from between about 20 to about 50. More desirably, the Spun-Blown® non-woven web 12 has a ratio of percent elongation, measured in the machine direction (MD), to fiber diameter of from between about 25 to about 45. Even more desirably, the Spun-Blown® non-woven web 12 has a ratio of percent elongation, measured in the machine direction (MD), to fiber diameter of from between about 25 to about 41.

The Spun-Blown® non-woven web 12 further has a ratio of percent elongation, measured in the cross direction (CD), to fiber diameter of at least about 15. Desirably, the Spun-Blown® non-woven web 12 has a ratio of percent elongation, measured in the cross direction (CD), to fiber diameter of from between about 20 to about 50. More desirably, the Spun-Blown® non-woven web 12 has a ratio of percent elongation, measured in the cross direction (CD), to fiber diameter of from between about 25 to about 50. Even more desirably, the Spun-Blown® non-woven web 12 has a ratio of percent elongation, measured in the cross direction (CD), to fiber diameter of from between about 27 to about 49.

The fibers 98 forming the Spun-Blown® non-woven web 12 are randomly arranged.

The fibers 98 forming the Spun-Blown® non-woven web 12 can be bonded to increase the integrity of the Spun-Blown® non-woven web 12. The fibers 98 can be bonded using various techniques. For example, the fibers 98 can be mechanically bonded, hydro-mechanically bonded, thermally bonded, chemically bonded, etc. Spot bonding, zone bonding, as well as other bonding techniques known to those skilled in the art can be used.

The following experiments were performed and show the unique characteristics of the Spun-Blown® non-woven web 12 manufactured using the above described apparatus 10 and process.

Experiments

1. Inventive Spun-Blown® Non-Woven Web

The following nonwoven samples were produced using a pilot line that had two 25" dies with multi-row spinnerettes 52, 52 secured thereto, manufactured by Biax-FiberFilm Corporation having an office at N992 Quality Drive, Suite B, Greenville, Wis. 54942-8635. Each spinnerette 52, 52 had a total of 4,150 nozzles, each having an inside diameter $d_3$ of 0.305 mm. Each nozzle 58 was surrounded by a first enlarged opening 80 formed in the exterior member 78 where pressurized gas (air) was allowed to exit. The inside diameter $d_6$ of each of the first enlarged openings 80 was 1.4 mm. By comparison, a typical commercial spinnerette, manufactured by Biax-FiberFilm Corporation, can have from between about 6,000 to about 11,000 nozzles per meter. Conventional meltblown and spunbond material 22 (polymer) was obtained from different vendors and the processing condition and system parameters are disclosed in Table 2.

3. Characterization Methods 3.1 Basis Weight

Basis weight is defined as the mass per unit area and can be measured in grams per meter squared (g/m$^2$) or ounces per square yard (osy). A basis weight test was performed according the INDA standard IST 130.1 which is equivalent to the ASTM standard ASTM D3776. INDA is an abbreviation for: "Association of the Non-Woven Fabrics Industry". Ten (10) different samples were die-cut from different locations in the Spun-Blown® non-woven web and each sample had an individual area equal to 100 square centimeters (cm$^2$). The weight of each sample was measured using a sensitive balance within ±0.1% of weight on the balance. The basis weight, in grams/meter$^2$ (g/m$^2$) was measured by multiplying the average weight by a hundred (100).

3.2 Fiber Diameter Measurements

To examine the fiber morphology and the fiber diameter distribution of the manufactured nonwoven webs, samples were sputter coated with a 10 nanometer (nm) thin layer of gold and analyzed with a scanning electron microscope, model SEM, Phenom G2, manufactured by Phenom World BV having an office at Dillenburgstraat 9E, 9652 AM Eindhoven, The Netherlands. Images were taken at 500× and 1,500× magnification under 5 kilovolts (kV) of an accelerating voltage for the electron beams. Fiber diameters were measured using Image J software. "Image J" is a public domain, Java-based image processing program developed at the National Institute of Health and can be downloaded from http://imagej.nih.gov/ij/. For each sample, at least 100 individual fiber diameters were measured.

TABLE 2

| Sample | Polymer | Basis Weight (gsm) | Die Technology | Polymer Melt Temp ° C. | Gas Temp ° C. | Gas pressure (bar) | DCD (cm) | Polymer Throughput g/hole/min | Nozzle inside diameter (mm) |
|---|---|---|---|---|---|---|---|---|---|
| S-1 | Achieve 6936G1 | 20.5 | Biax-Old Design | 188 | 175 | 0.88 | 33 | 0.11 | 0.228 |
| S-2 | Achieve 6936G1 | 19.3 | Conventional MB die | 235 | 240 | 0.51 | 20 | 0.214 | 0.308 |
| S-3 | Achieve 6936G1 | 20.1 | Biax-New Design | 200 | 155 | 1.22 | 45 | 0.09 | °.308 |
| S-4 | Achieve 6936G1 | 29.9 | Conventional MB die | 235 | 240 | 0.51 | 20 | 0.3 | 0.308 |
| S-5 | PP3155 | 30.8 | Biax-New Design | 300 | 273 | 1.35 | 45 | 0.12 | 0.508 |
| S-6 | PP3155 | 30.1 | Spunbond Die | | | | | | |

2. Process Conditions

Several nonwovens webs were made using the above described pilot line.

Two different kinds of polymer resins were used. The first polymer resin was ExxonMobil polypropylene (PP) resin marketed under the trade name Achieve 6936G1. ExxonMobil Chemical has an office at 13501 Katy Freeway, Houston, Tex. 77079-1398. Achieve 6936G1 has a melt flow rate of 1,550 grams/10 minute (g/10 min.), according to American Standard Testing Method (ASTM) D 1238, at 210° C. and 2.16 kilograms (kg). The second polymer resin was ExxonMobil polypropylene—PP3155. PP1355 has a melt flow rate of 35 g/10 min., according to ASTM D 1238, at 210° C. and 2.16 kg. This is a typical spunbond grade resin. See Table 1 for process conditions.

3.3 Fabric Tensile Strength

The breaking force is defined as the maximum force applied to a nonwoven web carried to failure or rupture. For ductile material like nonwoven webs, they experience a maximum force before rupturing. The tensile strength was measured according to the ASTM standard D 5035-90 which is the same as INDA Standard IST 110.4 (95). To measure the strength of the Spun-Blown® non-woven web, six (6) specimen strips from each Spun-Blown® non-woven web were cutout at different locations across the Spun-Blown® non-woven web and each one had a dimension of 25.4 millimeters (mm)×152.4 mm (1" by 6"). Each strip was clamped between the jaws of the tensile testing machine which was a Thwing Albert Tensile Tester. The clamps pulled the strip at a constant rate of extension of 10 inch/- minute. The average breaking force and the average extension percentage at the breaking force was recorded for each Spun-Blown® non-woven web in the form of gram force per basis weight per width of Spun-Blown® non-woven web (gf/gsm/cm).

3.4 Air Permeability Measurement

Air permeability of Spun-Blown® non-woven fabrics is the measured airflow through an area of the fabric at a specific pressure drop. Using the Akustron Air Permeability Tester, the air permeability was measured for the fiber mats under a pressure drop equal to 125 Pa. Ten measurements for each mat were recorded and the average values are reported herein. This method of measuring air permeability is equivalent to the Frazier air permeability testing method or the ASTM D737 test method.

Example 1

In this example, we were looking at the effect of spinning technology on web properties. Three (3) different non-woven webs were made using the same polymer resin. All three (3) had the same basis weight but each was spun using a different spinnerette design and different processing conditions. As shown in Table 3, sample S-1 was produced using a Biax multi-row spinnerette design that did not have air insulation inserts 34 or an air shrouding curtain (second enlarged openings 82) surrounding the periphery 84 of the first enlarged openings 80. Sample S-2 was produced using a conventional meltblown process which had only one line of nozzles along with inclined air jets. Sample S-3 was produced using the inventive Spun-Blown® process.

10 is the use of a multi-row spinnerette design. The filaments 86 exiting the nozzles 58, located with the periphery 84, see FIG. 10, are not exposed to the surrounding ambient air and a quick quench time, and therefore these filaments 86 tend to stay hotter longer and thereby produce finer fibers 98 than the filaments 86 that are extruded from nozzles 58 located in the outside rows of a spinnerette body 52. By replacing the nozzles 58 with the stationary pins 62 in the outside rows 64, located adjacent to the periphery 68, see FIG. 7, an air curtain or shroud is formed around the plurality of extruded filaments 86. This air curtain or shroud delays the interaction of the surrounding ambient air with the extruded filaments 86. This delay prevents the early solidification of the molten polymer streams at the terminal tip 96 of each nozzle 58 and reduces shots and roping defects that are encountered when the old Biax multi-row spinnerette was used. This earlier multi-row spinnerette is taught in U.S. Pat. No. 5,476,616. By "shot defect" it is meant small, spherical particles of polymer formed during the web forming process. Table 3 also shows that air permeability of the Spun-Blown® sample S-3 was at least 50% higher than the conventional meltblown sample S-1 that was produced at the same condition. The main reason for such an increase is attributed to being able to attenuate the fibers with cold air. The cold air enables one to orient the polymer chains within each fiber making them more like spunbond fibers while keeping the fiber size smaller like conventional meltblown fibers. Also, the wider fiber diameter distribution helps the air permeability when using these webs for filtration purposes.

TABLE 3

Samples performance of Example 1

| Sample | Fiber Size. μm | Standard Deviation μm | Machine Direction Elongation Percent (%) | Machine Direction Strength gf/gsm/cm | Cross Direction Elongation Percent (%) | Cross Direction Strength gf/gsm/cm | Air Permeability $m^3/m^2 \cdot min$ |
|---|---|---|---|---|---|---|---|
| S-1 | 2.77 | 1.77 | 13.44 | 12.13 | 87.45 | 9.33 | 18.6 |
| S-2 | 1.66 | 0.82 | 17.77 | 10.28 | 24.11 | 9.96 | 11.1 |
| S-3 | 2.23 | 1.57 | 23.84 | 20.24 | 88.94 | 7.54 | 17.4 |

The sample S-3 achieved almost double the machine direction (MD) tensile strength as compared to sample S-1 or sample S-2. Also, one will notice that the fiber diameter of sample S-3 was slightly larger than the fiber diameter of the conventional meltblown sample S-2. The primary reason for this difference in diameter is that when using the inventive Spun-Blown® process, the colder air temperature in the annular channels is directed essentially parallel to the direction of flow of the filaments 86 in a multi-row fashion. In addition, by attenuating the fibers 98 using colder gas (air) one can increase fiber crystallinity and align the molecular chains inside the solidified fibers 98. This feature facilitates attenuation of the filaments into strong, fine fibers 98. In a conventional meltblown process, the attenuating air is introduced at a steep or inclined angle, using very hot air jets.

Figure 12:
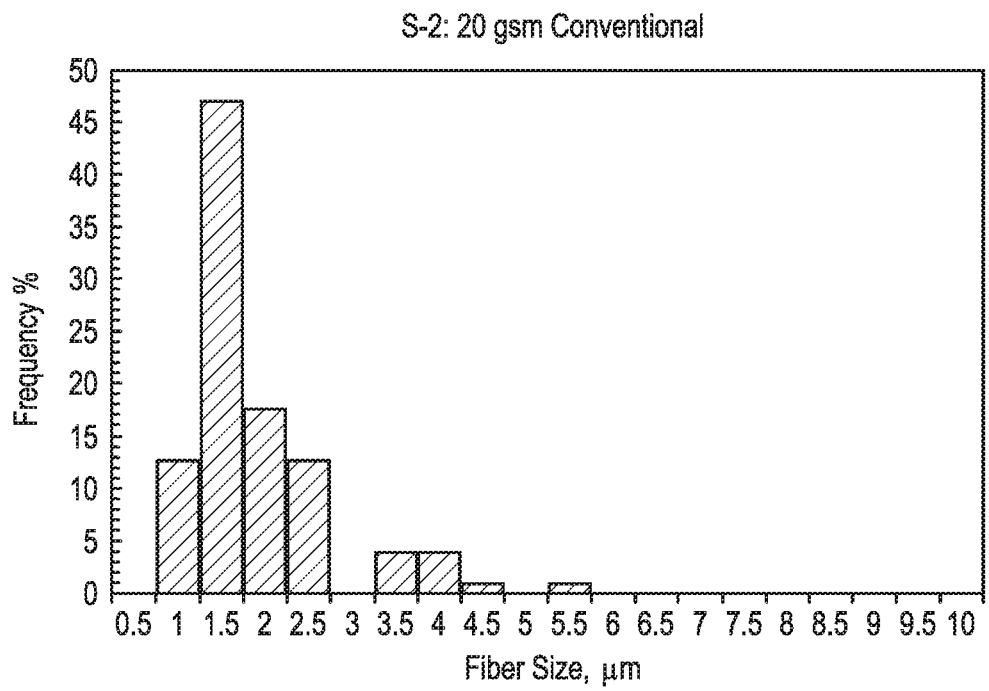
FIG. 12 is a pair of histograms comparing the difference in "Fiber Diameter Distribution" for a Spun-Blown® nonwoven web produced according to this invention and one produced using a conventional meltblown process.
Figure 12:
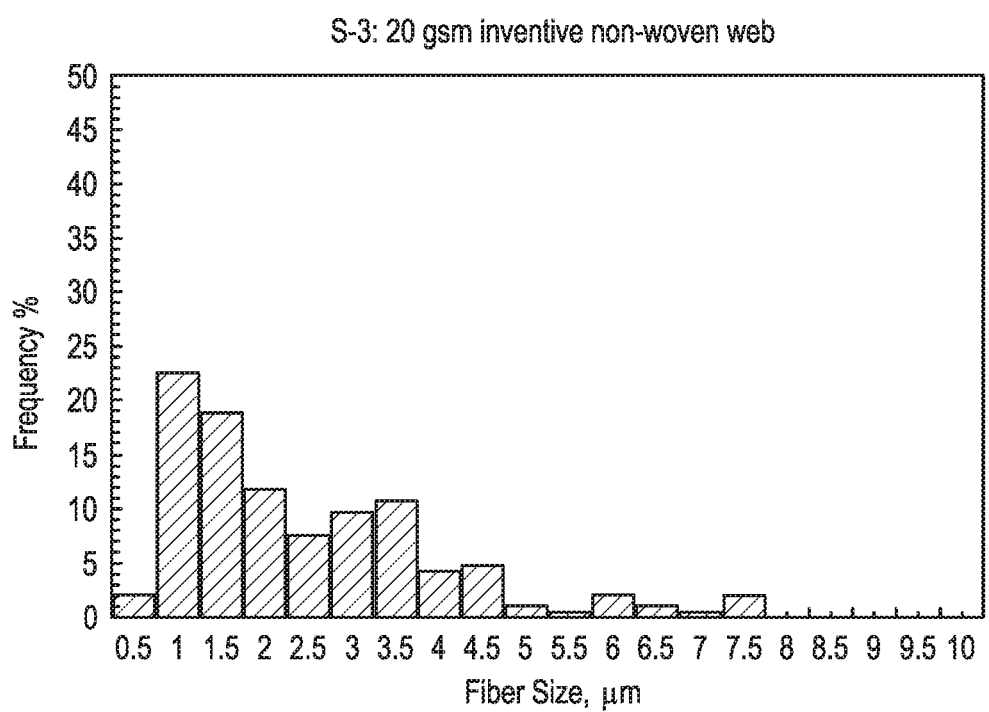

Referring now to FIG. 12, another interesting feature of the Spun-Blown® non-woven web 12 manufactured according to this invention is the wide "Fiber Diameter Distribution". When one compares this "Fiber Diameter Distribution" to the "Fiber Diameter Distribution" of a non-woven web produced using a conventional meltblown process, it is very clear that the standard deviation values and the "Fiber Diameter Distribution" are very different. The main reason for this wide "Fiber Diameter Distribution" in our apparatus It should be understood that the fibers 98 in the non-woven web 12 can have a Standard Deviation of from between about 0.9 microns to about 5 microns. Desirably, the fibers 98 in the non-woven web 12 have a Standard Deviation of from between about 0.92 microns to about 3 microns. More desirably, the fibers 98 in the non-woven web 12 have a Standard Deviation of from between about 0.95 microns to about 1.5 microns.

Example 2

In this second example, we were comparing a sample produced by the inventive process S-5 to a sample produced by a conventional meltblown process S-4, and to sample produced by a conventional spunbond process S-6. Three (3) samples were made and each had the same basis weight. As shown in Table 4, the properties of sample S-5 were about half-way between the properties of the conventional meltblown web S-4 and the spunbond web S-6. Table 3 also shows that the air permeability of the sample S-5 (using our inventive process) falls almost half-way between the conventional meltblown sample S-4 and the conventional spunbond sample S-6. This proves that our new technology is capable of producing Spun-Blown® non-woven webs that have fine fiber diameters, comparable to meltblown fibers, yet strong as compared to spunbond fibers.

Figure 13:
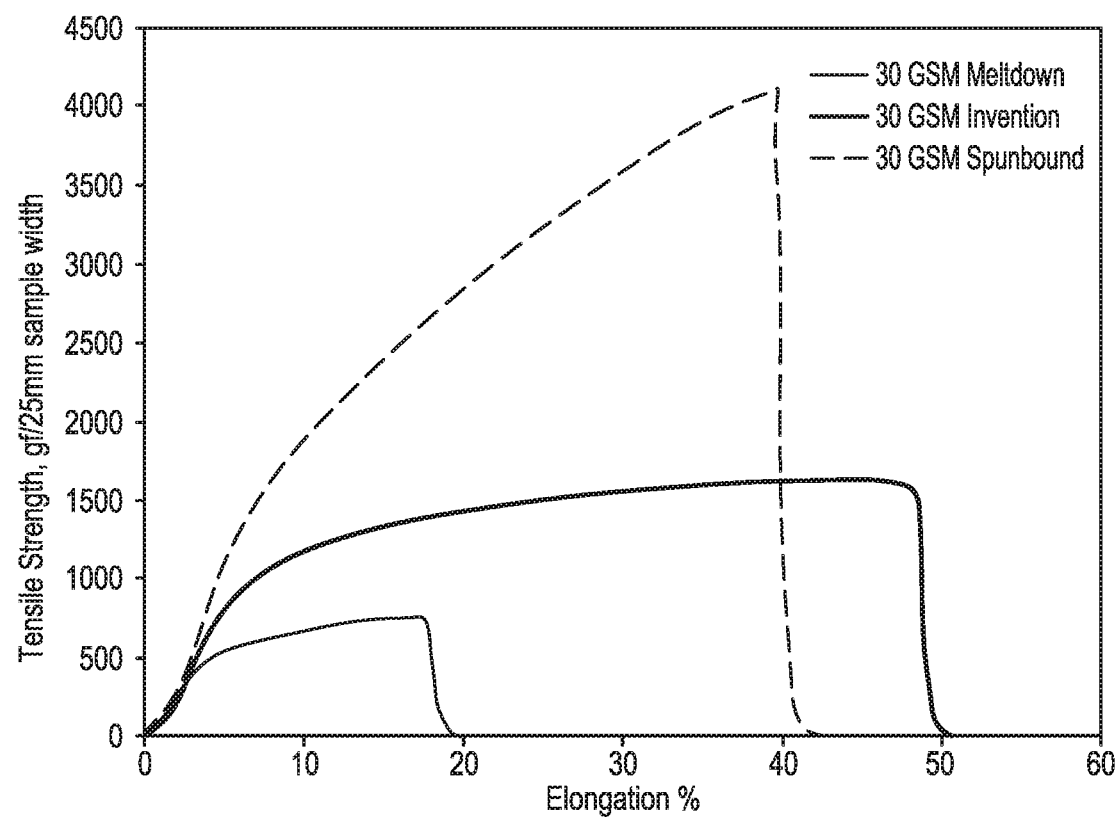
FIG. 13 is a graph comparing machine direction (MD) tensile strength for a conventional meltblown web, a conventional spunbond web, and a Spun-Blown® non-woven made according to this invention.

Referring to FIG. 13, the machine direction (MD) tensile strength of the Spun-Blown® non-woven web 12 of this invention (sample S-5) was more than double the MD tensile strength of the conventional meltblown web sample S-4 and almost half the MD tensile strength of the spunbond web sample S-6. Another noticeable feature was that the extensibility of the Spun-Blown® non-woven web 12 of this invention (sample S-5) was almost triple the extensibility of the meltblown web sample S-4 and similar to the extensibility of the spunbond web sample S-6.

From the above two examples, it is clear that a Spun-Blown® non-woven web 12 made using our inventive apparatus and process is unique and has properties that are about half-way between the properties exhibited by a non-woven web made using a conventional meltblown process and a non-woven web made using a conventional spunbond process.

Furthermore, the apparatus 10 of this invention is flexible and versatile enough to use a wide variety of polymeric resins to produce a wide range of Spun-Blown® non-woven webs. The apparatus 10 can be operated using meltblown grade resins and well as spunbond grade resins.

TABLE 4

Samples performance of Example 2

| Sample | Fiber Size. μm | Standard Deviation μm | Machine Direction Elongation Percent (%) | Machine Direction Strength gf/gsm/cm | Cross Direction Elongation Percent (%) | Cross Direction Strength gf/gsm/cm | Air Permeability m³/m² · min |
|---|---|---|---|---|---|---|---|
| S-4 | 2.33 | 1.35 | 15.19 | 10.2 | 33.49 | 16.25 | 7.2 |
| S-5 | 4.39 | 2.98 | 41.02 | 21.24 | 62.86 | 15.96 | 53.7 |
| S-6 | 19.48 | 1.49 | 41.35 | 51.56 | 46.16 | 49.39 | 135.8 |

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A nonwoven material comprising:
a one-layer nonwoven web that includes:
   a plurality of fibers formed from a molten homopolymer having an average fiber diameter that is less than about 8 microns, the fibers defining groups of fiber diameters with each group defining a range of about ½ micron of variation with respect to each other and none of the groups of fiber diameters providing more than about 25% of the total fibers of the one-layer nonwoven web;
   a basis weight of at least about 1 gsm (grams per square meter);
   an extensibility characteristic determined by a percent elongation value, measured in a machine direction;
   a ratio of percent elongation, measured in the machine direction, to an average fiber diameter measured in microns of at least 9:1;
   a breaking force characteristic that corresponds to a machine direction tensile strength, measured in a machine direction; and
   a ratio of machine direction tensile strength to basis weight of between 25:1 to 50:1.

2. The non-woven web of claim 1 wherein the web has a ratio of percent elongation, measured in the cross direction, to percent elongation, measured in the machine direction, of up to about 1.53:1.

3. The non-woven web of claim 1 wherein the web has a percent elongation, measured in the cross direction, of up to about 88.94%.

4. The non-woven web of claim 1 wherein the web has an average fiber diameter ranging from between about 1 micron to about 10 microns and a percent elongation, measured in the cross direction, from between about 62% to about 89%.

5. The non-woven web of claim 1 wherein the homopolymer is polypropylene, and the web has an average fiber diameter ranging from between about 1 micron to about 10 microns and a percent elongation, measured in each of the machine direction and the cross direction, of between about 23.8% and 46.2%.

6. The non-woven web of claim 1 wherein the homopolymer is polypropylene.

7. The non-woven web of claim 6 wherein the non-woven web has:
   a basis weight of between 20 gsm and 30 gsm;
   an average fiber diameter of 0.5 microns and 50 microns; and
   a standard deviation of fiber diameter of between 67% and 70% of the average fiber diameter.

8. A nonwoven material comprising:
a one-layer nonwoven web that includes:
   a plurality of fibers formed from a molten homopolymer having an average fiber diameter ranging from between about 1 micron to about 7.5 microns, the fibers defining groups of fiber diameters with none of the groups of fiber diameters providing more than about 25% of the total fibers of the one-layer nonwoven web;
   a basis weight of at least about 1 gsm (grams per square meter);
   a machine direction tensile strength, measured in a machine direction, and defining a maximum machine direction tensile strength;
   a cross direction tensile strength, measured in a cross direction, and defining a maximum cross direction tensile strength that is less than the maximum machine direction tensile strength; and
   a unimodal fiber size distribution that defines a number of fibers having a diameter greater than or equal to the distribution's mode plus one standard deviation but less than the distributions mode plus two standard deviations is at least 40% of the number of fibers having a diameter greater than or equal to the distribution's mode but less than the distribution's mode plus one standard deviation.

9. The non-woven web of claim 8, wherein the one-layer nonwoven web further includes:
a ratio of percent elongation, measured in the machine direction, to an average fiber diameter measured in microns of between 9:1 to 10.7:1.

* * * * *